United States Patent
Ichihara et al.

(10) Patent No.: US 10,225,450 B2
(45) Date of Patent: Mar. 5, 2019

(54) IMAGE CAPTURING APPARATUS AND IMAGE CAPTURING UNIT

(71) Applicant: CANON KABUSHIKI KAISHA, Tokyo (JP)

(72) Inventors: Ko Ichihara, Toride (JP); Chiaki Inoue, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/911,745

(22) Filed: Mar. 5, 2018

(65) Prior Publication Data
US 2018/0255220 A1    Sep. 6, 2018

(30) Foreign Application Priority Data
Mar. 6, 2017  (JP) ................. 2017-041261

(51) Int. Cl.
| | |
|---|---|
| G02B 13/02 | (2006.01) |
| G02B 27/00 | (2006.01) |
| H04N 5/222 | (2006.01) |
| H04N 5/225 | (2006.01) |
| H04N 5/232 | (2006.01) |

(52) U.S. Cl.
CPC ........... H04N 5/2258 (2013.01); G02B 13/02 (2013.01); G02B 27/0025 (2013.01); H04N 5/2226 (2013.01); H04N 5/23212 (2013.01)

(58) Field of Classification Search
CPC .. G02B 13/02; G02B 27/0025; H04N 5/2226; H04N 5/2258; H04N 5/23212
See application file for complete search history.

(56) References Cited

U.S. PATENT DOCUMENTS

| | | | | |
|---|---|---|---|---|
| 7,209,175 | B1 * | 4/2007 | Kurokawa | G03B 13/36 348/345 |
| 8,780,200 | B2 * | 7/2014 | Yamamoto | H04N 5/23293 348/143 |
| 9,118,907 | B2 * | 8/2015 | Yamagata | H04N 5/23212 |
| 2003/0020814 | A1 * | 1/2003 | Ono | H04N 5/225 348/220.1 |

(Continued)

FOREIGN PATENT DOCUMENTS

| | | |
|---|---|---|
| JP | H08194153 A | 7/1996 |
| JP | H0943682 A | 2/1997 |

(Continued)

*Primary Examiner* — Amy R Hsu
(74) *Attorney, Agent, or Firm* — Rossi, Kimms & McDowell LLP

(57) ABSTRACT

An image capturing apparatus (1) includes a first image capturer (100) including a first image capturing optical system (101) and a first image sensor (102), and a second image capturer (110) including a second image capturing optical system (111a) and a third image capturing optical system (111b) with different viewpoints from each other and a second image sensor (112), an angle of field of each of the second image capturing optical system and the third image capturing optical system is larger than an angle of field of the first image capturing optical system, each of the second image capturing optical system and the third image capturing optical system includes at least two reflection members (P1a, P2a; P1b, P2b) that introduces light from an object to the second image sensor, and a predetermined conditional expression is satisfied.

15 Claims, 13 Drawing Sheets

(56) References Cited

U.S. PATENT DOCUMENTS

| 2012/0019708 A1* | 1/2012 | Morihisa | G02B 7/30 |
| | | | 348/348 |
| 2013/0120644 A1* | 5/2013 | Fujii | G02B 7/36 |
| | | | 348/349 |
| 2016/0110844 A1* | 4/2016 | Humfeld | H04N 5/23232 |
| | | | 348/239 |

FOREIGN PATENT DOCUMENTS

| JP | 2012003098 A | 1/2012 |
| JP | 2012049651 A | 3/2012 |
| JP | 2013042379 A | 2/2013 |
| JP | 2013081159 A | 5/2013 |

* cited by examiner

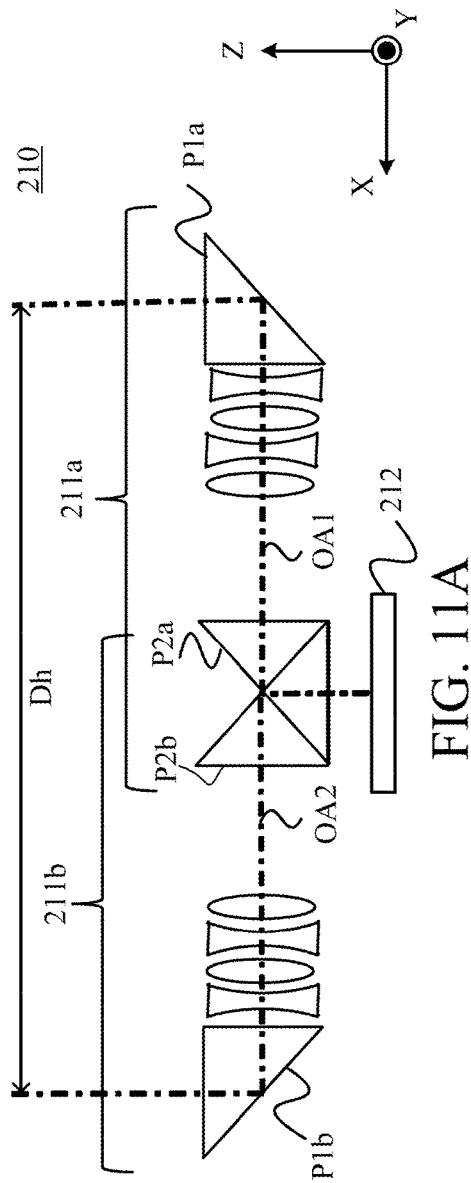
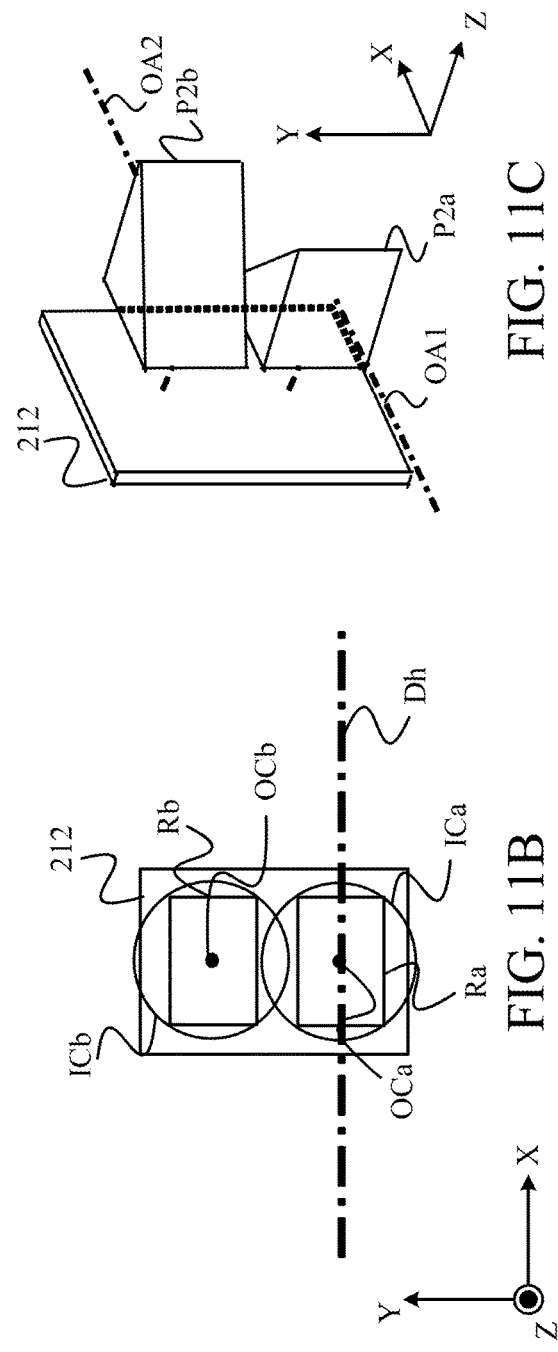
FIG. 11A
FIG. 11B
FIG. 11C

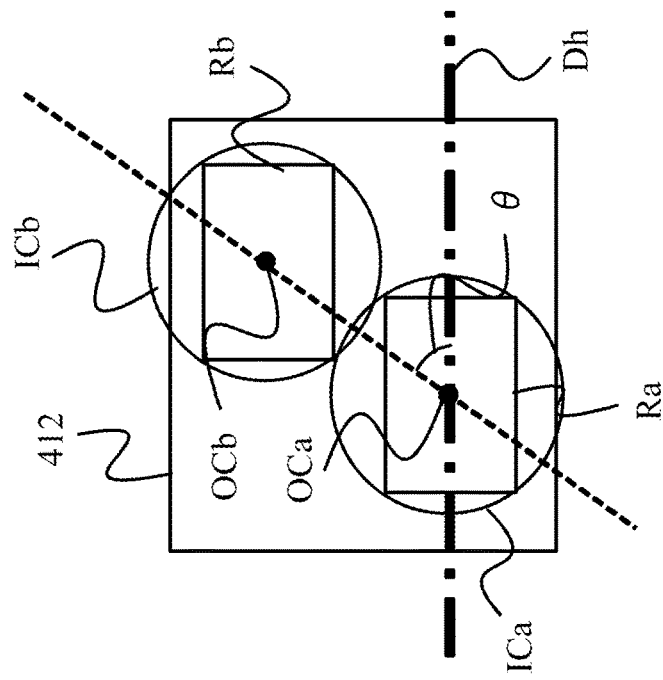
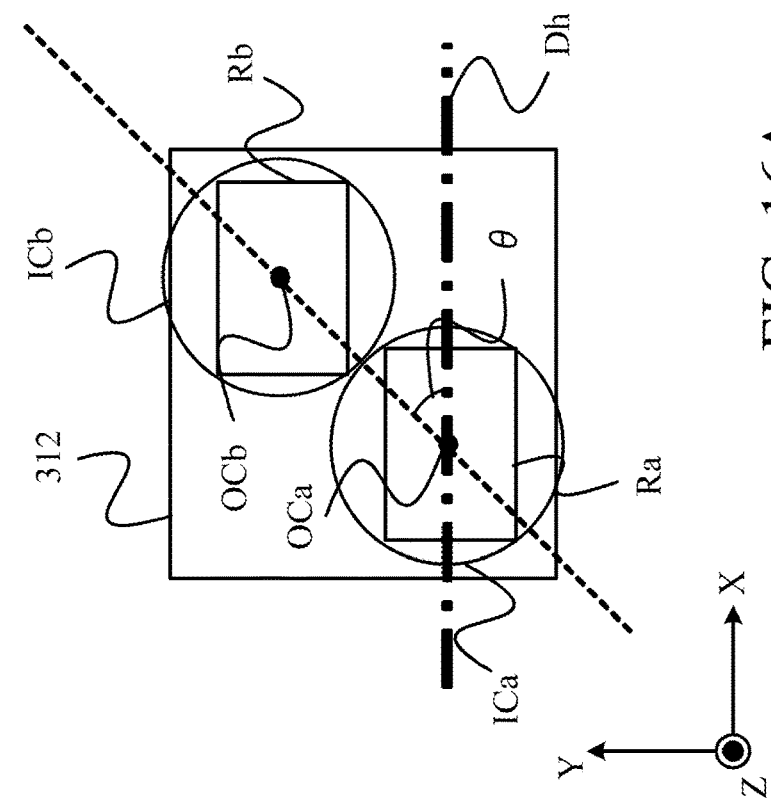
FIG. 16A
FIG. 16B

IMAGE CAPTURING APPARATUS AND IMAGE CAPTURING UNIT

BACKGROUND OF THE INVENTION

Field of the Invention

The present invention relates to an image capturing apparatus including a plurality of image capturer.

Description of the Related Art

Conventionally, an autofocus using a contrast AF method is known in which a digital camera calculates a contrast of an image while changing a focus position to obtain the focus position where the contrast is maximized as an in-focus position. The autofocus using the contrast AF method has high focusing accuracy, but its processing speed is slow. In addition, it cannot appropriately perform the focusing for an object that is located far outside a range of the depth of field of an image capturing optical system in some cases. These problems are particularly conspicuous when the image capturing optical system is a telephoto lens that has a relatively small depth of field.

Further, an image capturing apparatus is known which includes a unit for acquiring an object distance separately from the image capturing optical system for acquiring an image and focuses an imaging lens in accordance with distance information output from the unit. In particular, the image capturing apparatus is known which includes two sub image capturing optical systems separately from a main image capturing optical system, acquires the object distance based on the principle of triangulation using the two sub image capturing optical systems to focus the main image capturing optical system. Further, in order to miniaturize and reduce the cost of the two sub image optical systems, the configuration is known in which each image capturing optical system includes a reflection member (for example, a prism) for bending an optical axis to introduce an object image formed by the two image capturing optical systems to a single image sensor unit.

Japanese Patent Laid-open No. H9-43682 discloses a finder apparatus in which a range finder and an autofocus unit are combined and the respective entrance windows are integrated. Japanese Patent Laid-open No. 2013-42379 discloses an image capturing apparatus that includes two lenses and two image sensors for acquiring an object distance separately from a main imaging lens and a main image sensor to acquire a distance map image using them.

When an object distance is acquired by using two image capturing optical systems, the calculation accuracy of the distance is decreased for an object that exists outside a range of the depth of field of each image capturing optical system (that is, an object that is blurred). Considering from this viewpoint, in order to deepen the depth of field, it is preferred that focal lengths of the two image capturing optical systems used for calculating the object distance are short. However, in order to calculate the object distance with high resolution, it is necessary that a length (base length) of the straight line (base line) connecting each image capturing optical system or each focal length is large. In a case where the focal length of the image capturing optical system constituting a stereo camera is shortened in order to deepen the depth of field of each image capturing optical system, instead, it is preferred that the base length increases.

The finder apparatus disclosed in Japanese Patent Laid-open No. H9-43682 has a configuration where a reflection member is provided to introduce an object image formed by two objective lenses to a single image sensor unit, and the sum of the focal lengths of the respective objective lenses substantially corresponds to the base length. That is, when the focal length of the objective lens is shortened, the base length cannot be increased. Japanese Patent Laid-open No. 2013-42379 discloses contents for acquiring the distance map image by using the two image capturing optical systems separately from the main image capturing optical system, but it does not describe the configuration of the two image capturing optical systems and contents for increasing the base length while shortening the focal length.

SUMMARY OF THE INVENTION

The present invention provides an image capturing apparatus and an image capturing system capable of focusing with high accuracy and at high speed over a wide distance range.

An image capturing apparatus as one aspect of the present invention includes a first image capturer including a first image capturing optical system and a first image sensor, and a second image capturer including a second image capturing optical system and a third image capturing optical system with different viewpoints from each other and a second image sensor, an angle of field of each of the second image capturing optical system and the third image capturing optical system is larger than an angle of field of the first image capturing optical system, each of the second image capturing optical system and the third image capturing optical system includes at least two reflection members configured to introduce light from an object to the second image sensor, and a predetermined condition expression is satisfied.

An image capturing unit as another aspect of the present invention is detachable from an image capturing apparatus including a first image sensor that photoelectrically converts an optical image formed via a first image capturing optical system, includes a second image capturing optical system and a third image capturing optical system with different viewpoints from each other, and a second image sensor configured to photoelectrically convert a first optical image formed via the second image capturing optical system and a second optical image formed via the third image capturing optical system, each of the second image capturing optical system and the third image capturing optical system includes at least two reflection members configured to introduce light from an object to the second image sensor, and a predetermined conditional expression is satisfied.

Further features of the present invention will become apparent from the following description of exemplary embodiments with reference to the attached drawings.

BRIEF DESCRIPTION OF THE DRAWINGS

FIGS. 11A to 11C are configuration diagrams of a sub image capturer in Embodiment 2.

FIGS. 16A and 16B are front views of an image sensor in each of Embodiments 3 and 4.

DESCRIPTION OF THE EMBODIMENTS

Exemplary embodiments of the present invention will be described below referring to the accompanied drawings.

Figure 1:
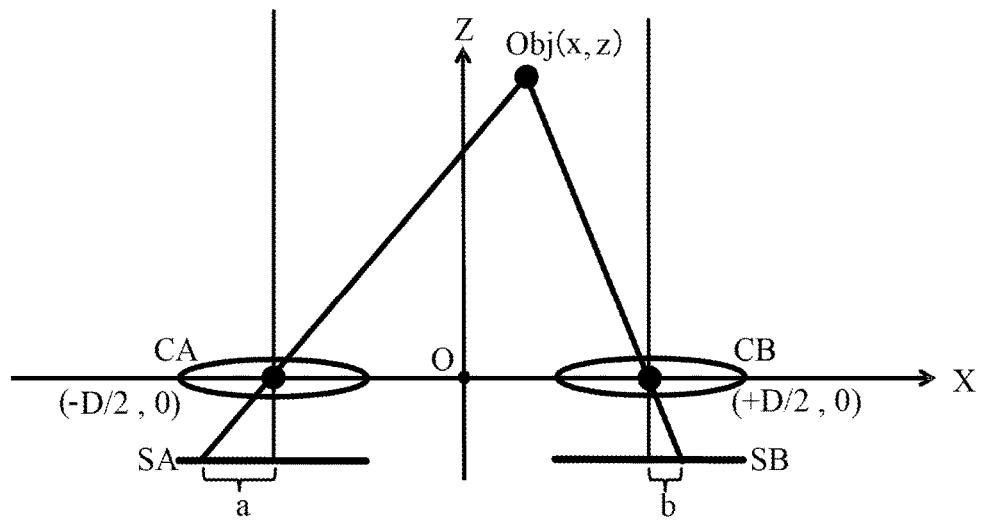
FIG. 1 is an explanatory diagram of a method of calculating an object distance in each embodiment.

First, referring to FIG. 1, a method of acquiring an object distance using two image capturing optical systems will be described. FIG. 1 is an explanatory diagram of a method of calculating the object distance, and it illustrates a situation where an image of an object Obj existing at one point in an imaging scene is captured by using two image capturing optical systems CA and CB having the same structure. Image sensors SA and SB receive object images (optical images) formed by the image capturing optical systems CA and CB, respectively. The centers of entrance pupils of the image capturing optical systems CA and CB exist at (−D/2,0) and (D/2,0), respectively, and the object Obj exists at (x,z). Assuming that a focal length of each of the image capturing optical systems CA and CB is f, and coordinates of the object Obj in the image sensors SA and SB are a and b, respectively, expression (1) below is satisfied.

$$z = \frac{fD}{b-a} \quad (1)$$

In expression (1), b−a is a positional deviation on an imaging plane when the same object is imaged from different viewpoints, that is, parallax. If the parallax b−a (parallax amount) can be acquired, by assigning the parallax b−a, the focal length f of each of the image capturing optical systems CA and CB, and a base length D to expression (1), it is possible to calculate an object distance z (i.e., a distance from the center of the entrance pupil of the image capturing optical system to the object Obj).

Figure 2:
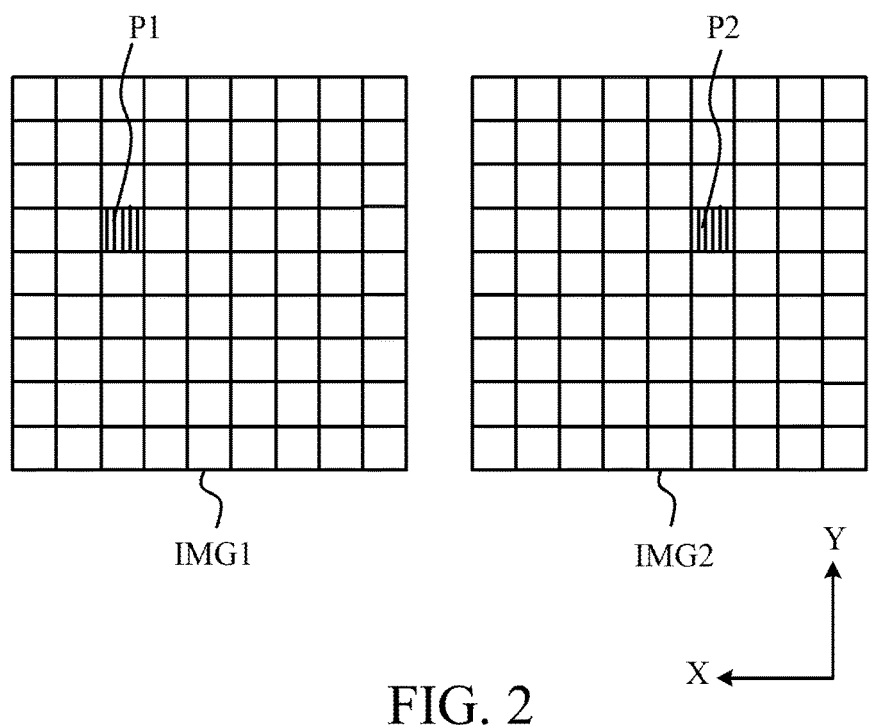
FIG. 2 is an explanatory diagram of corresponding object search processing in each embodiment.

Subsequently, referring to FIG. 2, corresponding object search processing for acquiring the parallax amount from the two images acquired by using the two image capturing optical systems will be described. FIG. 2 is an explanatory diagram of the corresponding object search processing, and it illustrates images IMG1 and IMG2 captured from different viewpoints. The image coordinate (X,Y) is defined with the center of a pixel group illustrated in FIG. 2 as the origin, the horizontal direction is the X axis, and the vertical direction is the Y axis. A pixel value of the image IMG1 located at the image coordinate (X,Y) is assumed to be F1(X,Y), and a pixel value of the image IMG2 is assumed to be F2(X,Y). A pixel of the image IMG2 corresponding to an arbitrary coordinate (X,Y) in the image IMG1 can be obtained by searching the pixel value of the image IMG2 most similar to the pixel value F1(X,Y) of the image IMG1 at the coordinate (X,Y). In the following description, a corresponding point on an image and a corresponding pixel are the same meaning.

Pixels P1 and P2 indicated by vertical lines on the images IMG1 and IMG2 illustrated in FIG. 2 correspond to corresponding pixels (corresponding points) on which light from the same object is recorded. However, it is commonly difficult to find the pixel most similar to an arbitrary pixel, and therefore similar pixels can be searched by a method, called a block matching method, by using pixels closer to the image coordinate (X,Y) as well.

For example, block matching processing when a block size is 3 will be described. Pixel values of total of three pixels of a pixel (target pixel) at an arbitrary coordinate (X,Y) in the image IMG1 and two pixels located at coordinates (X−1,Y) and (X+1,Y) next to the target pixel are F1(X,Y), F1(X−1,Y), and F1(X+1,Y), respectively. With respect to the three pixels, pixel values of pixels in the image IMG2 that are shifted by k in an X direction from the coordinate (X,Y) are F2(X+k,Y), F2(X+k−1,Y), and F2(X+k+1,Y), respectively. At this time, a similarity (degree of similarity) E between the target pixel located at the coordinate (X,Y) in the image IMG1 and the pixel located at the coordinate (X+k,Y) in the image IMG2 is defined by expression (2) below.

$$E = \quad (2)$$
$$[F1(X, Y) - F2(X+k, Y)]^2 + [F1(X-1, Y) - F2(X+k-1, Y)]^2 +$$
$$[F1(X+1, Y) - F2(X+k+1, Y)]^2 =$$
$$\sum_{j=-1}^{1} [F1(X+j, Y) - F2(X+k+j, Y)]^2$$

The similarity E is calculated while the value k is sequentially changed in expression (2), and the coordinate (X+k,Y) that gives the smallest similarity E is the coordinate of the pixel of the image IMG2 corresponding to the target pixel of the image IMG1. In this embodiment, although the similarity E is calculated while the coordinate is sequentially changed only in the X direction, the similarity E may be calculated while the coordinate is sequentially changed in a Y direction or both the X direction and the Y direction. By performing such corresponding object search processing, it is possible to acquire the coordinate of the corresponding point (corresponding pixel) in each of the two images and calculate the parallax amount that is a difference amount between them.

As described above, it is possible to calculate the parallax amount by performing the corresponding object search processing in the two images acquired by using the two image capturing optical systems and calculate the object distance based on the parallax amount. The relationship between the parallax amount and a defocus amount as an image plane movement amount is determined according to the image capturing optical system. Therefore, it is possible to calculate the defocus amount based on the parallax amount. Then, an amount of extension of a lens can be obtained based on the defocus amount to move the lens to be focused (phase difference AF).

When performing the corresponding object search processing, it is preferred that the two images to be used are focused and sharp images. In other words, it is preferred that the object is within a depth of field of the image capturing optical system when each of the two images is to be captured. This is because when the object is blurred, an incorrect point different from a true corresponding point is calculated as a corresponding point, and as a result there is a possibility that an erroneous object distance is calculated.

Subsequently, the calculation accuracy of the object distance will be described. When the object distance is s, a base length between the two image capturing optical systems is D, and the focal length of each of the two image capturing optical systems is f, an object distance resolution $\Delta z$ can be represented by expression (3) below.

$$\Delta z = \frac{s}{\frac{Df}{2r(s-f)} + 1} \tag{3}$$

In Expression (3), r is the parallax resolution, and the parallax amount acquired by the corresponding object search processing includes an error of ±r at a maximum. The object distance resolution $\Delta z$ is a maximum error amount when calculating the object distance, which means that the object distance including the error of ±$\Delta z$ at the maximum is calculated when the distance of the object located at the object distance s is acquired. In other words, the smaller the object distance resolution $\Delta z$ is, the higher the calculation accuracy of the object distance is. Specifically, the calculation accuracy of the object distance increases as the object distance s is small (i.e., as the object s is close), the base length D increases, the focal length f increases, or the parallax resolution r decreases.

The image capturing apparatus (image capturing system) of each embodiment includes a first image capturer (main image capturer) and a second image capturer (sub image capturer). The main image capturer includes one image capturing optical system and one image sensor, and it is a main image capturer for capturing an image. The sub image capturer includes two image capturing optical systems and one image sensor, and it acquires the object distance described above by using the image capturing optical systems. The image capturing apparatus focuses the main image capturer based on the object distance information acquired by using the sub image capturer. An angle of field of each of the two image capturing optical systems in the sub image capturer is larger than an angle of field of the image capturing optical system in the main image capturer, and it is possible to acquire the object distance over the entire angle of field of the main image capturer by using the sub image capturer. Therefore, the image capturing apparatus can acquire the distance of an arbitrary object within the angle of field of the main image capturer to focus the main image capturer on the object. If the object distance resolution $\Delta z$ described above is smaller than the depth of field of the image capturing optical system of the main image capturer, the image capturing apparatus can focus the main image capturer with high accuracy by using the object information acquired by the sub image capturer.

Assuming that the focal length of the image capturing optical system is f and an F number of the image capturing optical system is F, the object distance is s, and a permissible circle of confusion is $\delta$, the depth of field DoF can be generally represented by expression (4) below.

$$DoF = \frac{s(s-f)}{\frac{f^2}{F\delta} - (s+1)} \tag{4}$$

If the object distance resolution $\Delta z$ calculated using parameters of the image capturing optical system of the sub image capturer is smaller than the depth of field DoF calculated using parameters of the image capturing optical system of the main image capturer, it is possible to focus the image capturing optical system of the main image capturer by using the information of the sub image capturer. The image capturing apparatus of each embodiment satisfies conditional expression (5) below.

$$\frac{s(s-f_m)}{\frac{f_m^2}{F_m \delta_m} - (s+1)} > \frac{s}{\frac{Df_s}{2r_s(s-f_s)} + 1} \tag{5}$$

In conditional expression (5), $f_m$ is the focal length of the image capturing optical system of the main image capturer, $F_m$ is the F number, $\delta_m$ is the permissible circle of confusion, $f_s$ is the focal length of the image capturing optical system of the sub image capturer, D is the base length, and $r_s$ is parallax resolution. When conditional expression (5) is modified, the relationship of conditional expression (6) below can be derived.

$$\frac{(s-f_m)}{(s-f_s)} \frac{Df_s}{2r_s} - \frac{f_m^2}{F_m \delta_m} + 2 + s > 0 \tag{6}$$

When approximating conditional expression (6) on conditions that the object distance s is sufficiently larger than the focal lengths $f_s$ and $f_m$ and the parallax resolution $r_s$ and the permissible circle of confusion $\delta_m$ are considered to be sufficiently smaller than the focal lengths $f_m$ and $f_s$ and the base length D, conditional expression (7) can be obtained.

$$Df_s \frac{F_m}{f_m^2} > \frac{r_s}{2\delta_m} \tag{7}$$

The permissible circle of confusion $\delta_m$ and the parallax resolution $r_s$ depend on the pixel pitch $p_m$ of the image sensor of the main image capturer and the pixel pitch $p_s$ of the image sensor of the sub image capturer. Thus, the influence of each parameter of the main image capturer and the sub image capturer on the processing of focusing the main image capturer using the sub image capturer is as described above.

Preferably, the image capturing apparatus of each embodiment satisfies conditional expression (8) below.

$$0.5 > \frac{Df_s}{p_s} \frac{F_m p_m}{f_m^2} > 0.001 \tag{8}$$

When each parameter of the main image capturer and the sub image capturer satisfies conditional expression (8), it is possible to satisfactorily focus the main image capturer by using the sub image capturer.

More preferably, the image capturing apparatus of each embodiment satisfies conditional expression (9) below.

$$0.12 > \frac{Df_s}{p_s} \frac{F_m p_m}{f_m^2} > 0.008 \tag{9}$$

Preferably, the image capturing optical system included in the sub image capturer of each embodiment includes four lenses and two reflection members. More preferably, assuming that the focal length of each of the four lenses is f1, f2, f3, and f4 in order from a side close to the object on the optical axis of the image capturing optical system, conditional expressions (10), (11), and (12) are satisfied.

$$f_1/f_2 > -1 \tag{10}$$

$$f_4/f_3 < -1 \tag{11}$$

$$\frac{f_1}{f_2} \frac{f_4}{f_3} < 0.7 \tag{12}$$

By satisfying these conditional expressions, since a rear principal point position of the image capturing optical system is close to the image sensor, it is possible to increase the total length of the image capturing optical system compared to the focal length. As a result, in the image capturing optical system including the two reflection members, the base length D of the sub image capturer can be increased while the focal length is suppressed to be short, and it is possible to realize the image capturing apparatus satisfying conditional expression (8). Thus, the outline of the focusing method performed by the image capturing apparatus of the present invention is as described above. Hereinafter, the image capturing apparatus (image capturing system) will be described in detail in each embodiment.

Embodiment 1

Figure 3:
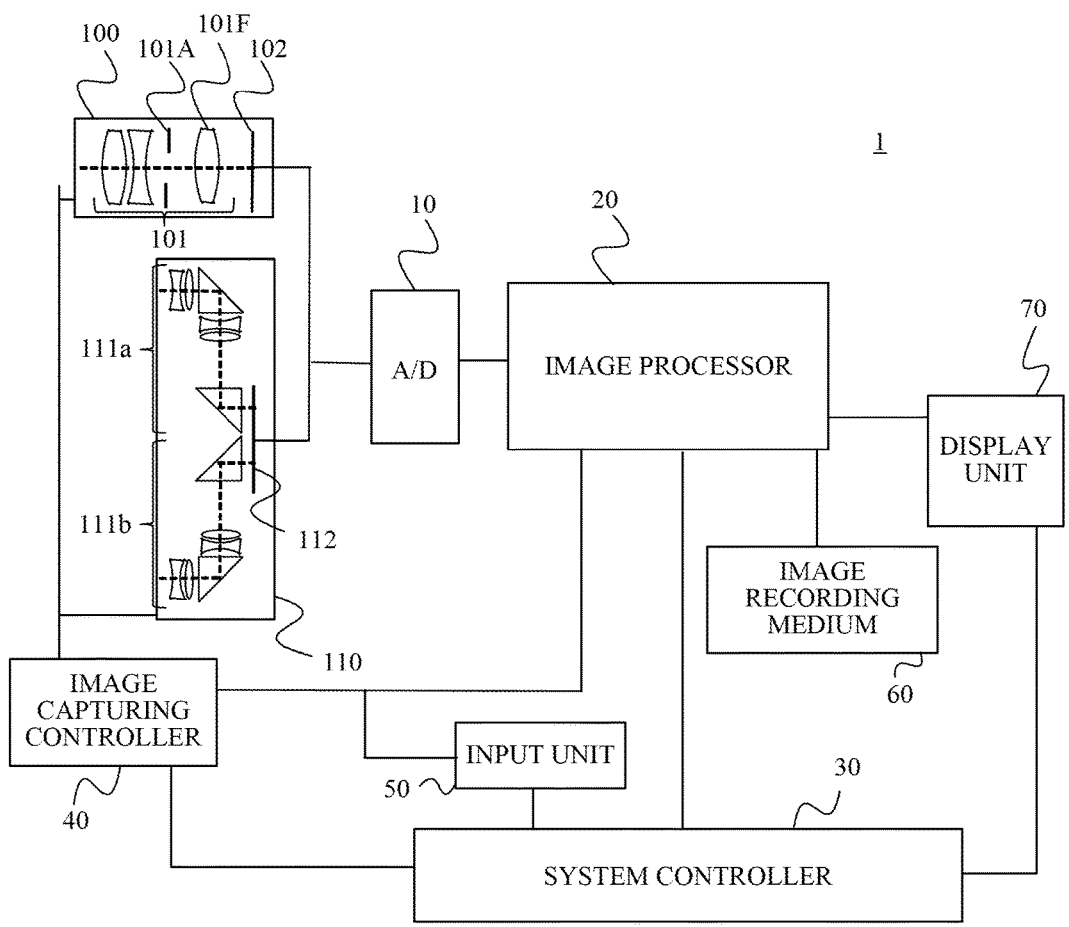
FIG. 3 is a block diagram of an image capturing apparatus in Embodiment 1.

First, referring to FIG. 3, an image capturing apparatus 1 in Embodiment 1 of the present invention will be described. FIG. 3 is a block diagram of the image capturing apparatus 1.

The image capturing apparatus 1 includes a main image capturer (first image capturer) 100 that is mainly used for imaging an object and a sub image capturer (second image capturer) 110 that acquires a distance of the object. The main image capturer 100 includes an image capturing optical system (first image capturing optical system) 101 and an image sensor (first image sensor) 102. The image capturing optical system 101 includes one or more lenses, an aperture stop 101A, and a focus lens 101F, and forms an image of light from the object (not illustrated) on the image sensor 102. The image capturing optical system 101 is a magnification-varying image capturing optical system whose focal length varies by the drive of one or more lenses provided in the image capturing optical system 101. Preferably, the angle of field of each of the image capturing optical systems 111a and 111b is larger than twice the angle of field of the image capturing optical system 101 at a telephoto end. In the case where the image capturing optical system of the main image capturer is the magnification-varying image capturing optical system as in this embodiment and the focal length of the image capturing optical system of the main image capturer at the telephoto end is $ft_s$, conditional expression (8) is written as represented by conditional expression (8a) below.

$$0.5 > \frac{Df_s}{p_s} \frac{F_m p_m}{ft_m^2} > 0.001 \tag{8a}$$

While the image capturing optical system 101 is configured as a part of the image capturing apparatus 1 in FIG. 3, it may be an interchangeable image capturing optical system such as a single-lens reflex camera. In other words, this embodiment can be applied to any of an image capturing apparatus in which an image capturing apparatus body including the image sensor 102 and the image capturing optical system 101 are integrally configured, or an image capturing apparatus in which the image capturing optical system 101 is detachable (i.e., an image capturing system including the image capturing optical system 101 and the image capturing apparatus body).

The image sensor 102 is a solid-state image sensor such as a CMOS sensor and a CCD sensor, and it photoelectrically converts an optical image (object image) formed via the image capturing optical system 101 to output an image signal (analog electric signal). Mechanical driving of the aperture stop 101A and the focus lens 101F in the image capturing optical system 101 is performed by an image capturing controller 40 based on an instruction (control) from a system controller (controller) 30. An opening diameter of the aperture stop 101A is controlled according to a set aperture value (F number). The image capturing controller 40 controls a position of the focus lens 101F according to the object distance to perform focus adjustment (i.e., focusing). An A/D converter 10 converts an analog electric signal (image signal) output from the image sensor 102 into a digital signal.

An image processor 20 performs so-called developing processing such as pixel interpolation processing, luminance signal processing, and color signal processing on the digital signal output from the A/D converter 10 to generate an image (image data). The image generated by the image processor 20 is recorded on an image recording medium 60 such as a semiconductor memory and an optical disk. Further, the image generated by the image processor 20 may be displayed on a display unit 70. An input unit 50 inputs various information according to an operation of a user.

The sub image capturer (second image capturer) 110 includes an image capturing optical system (second image capturing optical system) 111a, an image capturing optical system (third image capturing optical system) 111b, and an image sensor (second image sensor) 112. An angle of field of each of the image capturing optical systems 111a and 111b is larger than an angle of field of the image capturing optical system 101 in each of a horizontal direction and a vertical direction. As described below, each of the image capturing optical systems 111a and 111b includes at least two reflection members (prisms) to introduce light from the object to the image sensor 112. At an object side relative to an aperture (aperture stop) of each of the image capturing optical systems 111a and 111b, optical axes OA1 and OA2 of the image capturing optical systems 111a and 111b are parallel to each other. Each of the image capturing optical systems 111a and 111b is a fixed focal image capturing optical system that forms an image of light from an object (not illustrated) on the image sensor 112. The detail configuration of the sub image capturer 110 will be described below. An analog electric signal (image signal) generated by the image sensor 112 is output to the A/D converter 10 to be converted into a digital signal similarly to the case of the image sensor 102.

The image processor 20 generates two images output from the image sensor 112. These two images correspond to object images formed by the image capturing optical systems 111a and 111b, and they are two parallax images having a parallax with each other. In this embodiment, the sub image capturer 110 may be detachable from the image capturing apparatus 1. In this case, it is possible to select a sub image capturer (image capturing unit) suitable for the main image capturer 100 of the image capturing apparatus 1 from among the plurality of sub image capturers to be attached to the image capturing apparatus 1.

The image processor (distance calculator) 20 calculates the object distance based on the two parallax images (i.e., two image signals output from the image sensor 112) generated by the sub image capturer 110. The image processor 20 can calculate the distance of the object specified by the user via the input unit 50, or it may calculate the distance of the object existing in a center area of the angle of field of the main image capturer 100. Alternatively, it is possible to calculate the distances of all objects within an overlapped area of angles of field each other among angles of field of the image capturing optical systems 111a and 111b to generate a distance map image indicating these distances as pixel values. While the image capturing apparatus 1 includes one A/D converter 10 and one image processor 20 for the main image capturer 100 and the sub image capturer 110 in this embodiment, the present invention is not limited thereto. For example, a dedicated A/D converter and a dedicated image processor (a plurality of A/D converters and a plurality of image processors) may be provided for each of the main image capturer 100 and the sub image capturer 110. In this case, the dedicated image processor to the sub image capturer 110 is a distance calculator that is used for calculation of the object distance.

The system controller (controller) 30 controls driving of the image sensors 102 and 112, processing by the image processor 20, and the operation of the image capturing optical system 101. The image capturing controller 40 mechanically drives the aperture stop 101A and the focus lens 101F in the image capturing optical system 101 based on an instruction (control) from the system controller 30. The aperture diameter of the aperture stop 101A is controlled according to the set aperture value (F number). The image capturing controller 40 controls a position of the focus lens 101F according to the object distance to perform focus adjustment. The focus lens 101F may be controlled by the system controller 30 so that the contrast of the image acquired via the main image capturer 100 is maximized or its position may be controlled directly by the user.

Figure 4A:
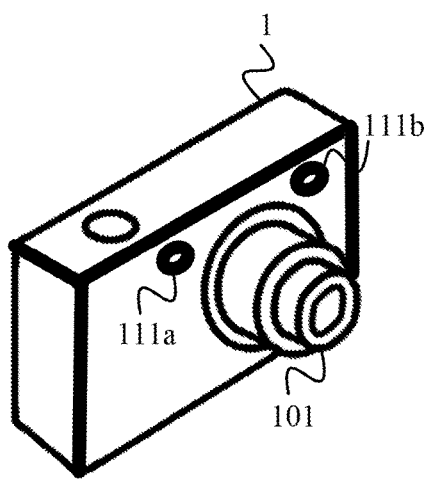
FIGS. 4A and 4B are external views of the image capturing apparatus in Embodiment 1.
Figure 4B:
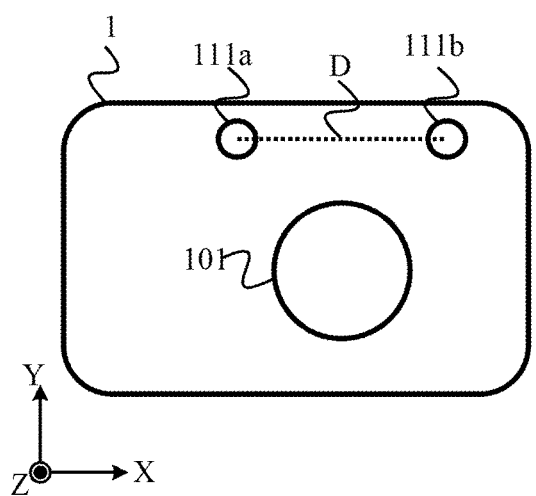
Figure 5A:
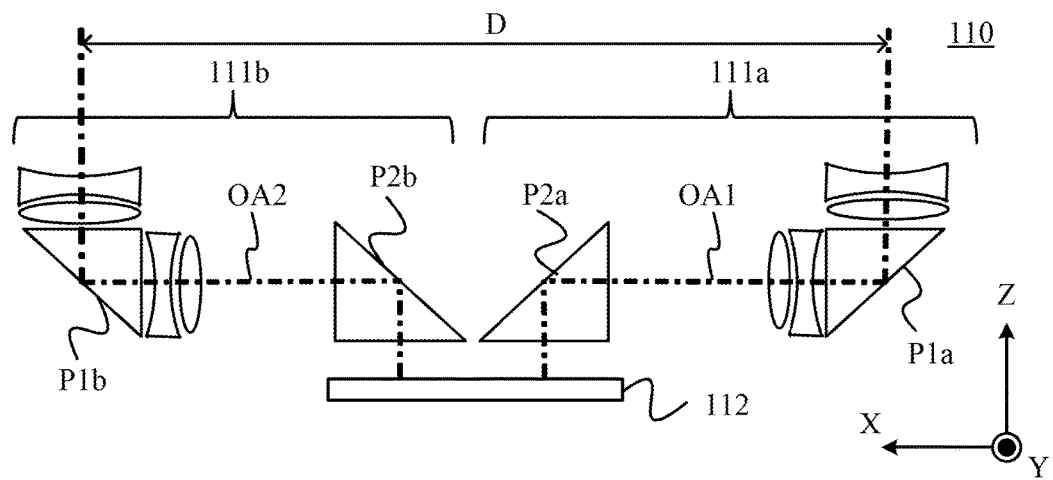
FIGS. 5A and 5B are configuration diagrams of a sub image capturer in Embodiment 1.
Figure 5B:
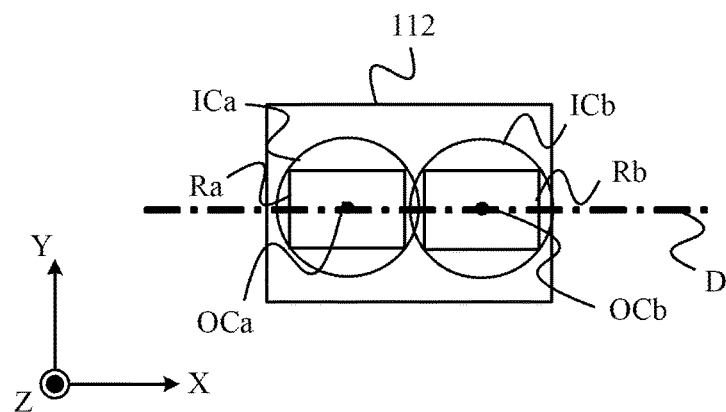

Subsequently, referring to FIGS. 4A, 4B, 5A and 5B, a detailed configuration of the sub image capturer 110 will be described. FIGS. 4A and 4B are external views of the image capturing apparatus 1, and FIGS. 4A and 4B illustrate a top view and a front view, respectively. FIGS. 5A and 5B are configuration diagrams of the sub image capturer 110, and FIGS. 5A and 5B illustrate a plan view of the sub image capturer 110 and a front view of the image sensor 112, respectively.

FIGS. 4A and 4B illustrate only the lens closest to the object of each of the image capturing optical systems 101, 111a, and 111b. The image capturing optical systems 111a and 111b constituting the sub image capturer 110 are arranged so that the length between the lenses closest to the object is 53 mm, and this length corresponds to the base length D of the sub image capturer 110.

As illustrated in FIG. 5A, the image capturing optical system 111a includes four lenses and two prisms P1a and P2a. Similarly, the image capturing optical system 111b includes four lenses and two prisms P1b and P2b. In FIG. 5A, each of optical axes OA1 and OA2 of the image capturing optical systems 111a and 111b is indicated by a dashed-dotted line. The optical axis OA1 of the image capturing optical system 111a is bent by 90 degrees in the prism P1a and by −90 degrees in the prism P2a in the XZ plane and enters the image sensor 112. That is, each of the prisms P1a and P2a bends the optical axis OA1 of the image capturing optical system 111a by 90 degrees. Each of the prisms P1b and P2b bends the optical axis OA2 of the image capturing optical system 111b by 90 degrees. The image capturing optical systems 111a and 111b have the same configuration and are disposed so as to be rotationally symmetric with respect to a straight line that passes through the center of the image sensor 112 and that is parallel to the Z axis.

Thus, by combining two reflection members (prisms) for bending the optical axes OA1 and OA2 twice, it is possible to realize a long base length even when one image sensor corresponds to two image capturing optical systems. This is because the base length is a line segment connecting the centers of entrance pupils of the two image capturing optical systems, and it corresponds to the distance between the centers of the lenses closest to the object of the image capturing optical systems 111a and 111b in the sub image capturer 110.

In FIG. 5B, the base length D is indicated by a dashed-dotted line. In FIG. 5B, an image circle of the image capturing optical system 111a is denoted by ICa, an intersection between the optical axis OA1 and the image sensor 112 is denoted by OCa, and an image reading area is denoted by Ra. Further, in FIG. 5B, an image circle of the image capturing optical system 111b is denoted by ICb, an intersection between the optical axis OA2 and the image sensor 112 is denoted by OCb, and an image reading area is denoted by Rb. As described above, the image capturing optical systems 111a and 111b are disposed such that a line connecting the intersections OCa and OCb of the respective optical axes OA1 and OA2 and the image sensor 112 and the base length D are substantially horizontal (parallel) to each other. Further, the image sensor 112 is disposed such that its long side is substantially parallel to the base length D, and its short side is substantially perpendicular to the base length D. Hereinafter, this arrangement is referred to as a horizontal arrangement of the prisms.

The image reading area is a pixel area corresponding to each of the image capturing optical systems 111a and 111b. By reading the pixels in this pixel area, the object image (optical image) formed by each of the image capturing optical systems 111a and 111b is acquired as an image. Since pixels outside the pixel reading area of the pixels of the image sensor 112 are not used, an image sensor in which pixels exist only in the pixel reading area may be used as the image sensor 112. Further, it may be an image sensor unit in which two groups of pixels corresponding to the image reading areas Ra and Rb are formed on one circuit board. Thus, it suffices that the distance between the two image reading areas Ra and Rb is small compared to the base length D, and the form of the image sensor or the image sensor unit can be arbitrarily changed.

The image capturing optical systems 111a and 111b and the image sensor 112 are integrally held by a mechanical unit (not illustrated), and they do not include any drive units. That is, the sub image capturer 110 does not include a focus mechanism. The image capturing optical systems 111a and 111b are held on the mechanical unit so as to be focused on a predetermined object at an arbitrary distance. In this embodiment, as an example, the image capturing optical systems 111a and 111b are held on the mechanical unit so as to be focused on an object separated by 5000 mm from the sub image capturer 110. However, this distance can be arbitrarily set.

In the two images used for calculating the parallax amount as described above, it is preferred that the object is in focus. Therefore, the image capturing optical systems 111a and 111b need to have a deep depth of field. The depth of field of the image capturing optical system can be enlarged by increasing the F number or decreasing the focal length f according to conditional expression (5). In order to calculate the object distance using the sub image capturer 110 even in a dark imaging environment, it is preferred that the F number is small. Therefore, in order to calculate the object distance in the dark imaging environment and realize the deep depth of field, the focal length f of the image capturing optical systems 111a and 111b needs to be small.

Each of the image capturing optical systems 111a and 111b of this embodiment includes at least one lens, and a lens closest to the object on the optical axis of each of the image capturing optical systems 111a and 111b has a negative refractive power. With such a configuration, it is possible to set each of the total lengths of the image capturing optical systems 111a and 111b to be longer than the focal length. This is because the lens closest to the object has the negative refractive power and a lens unit having a positive refractive power is disposed behind it, so that each of the rear principal point positions of the image capturing optical systems 111a and 111b can be located close to the image sensor 112. In this embodiment, the configuration is adopted in which the optical axes OA1 and OA2 are folded twice like the image capturing optical systems 111a and 111b. This increases the total length of each of the image capturing optical systems 111a and 111b, enabling to increase the distance between the two prisms P1a and P2a (the distance between the two prisms P1b and P2b), that is, the base length D. When the focal length f is small, the calculation accuracy of the object distance decreases as indicated by expression (3). However, by adopting such a configuration, even when the focal length f of each of the image capturing optical systems 111a and 111b is short, the base length D can be increased. Accordingly, it is possible to suppress deterioration of ranging accuracy (distance calculation accuracy).

The focal length of the image capturing optical system 101 provided in the main image capturer 100 at the telephoto end is 312 mm and the focal length at the wide angle end is 100 mm. The F number is 1.2, the size of the image sensor 102 is 1/2.3 type (that is, the diagonal length is 7.7 mm), and the pixel pitch is 1 μm. The focal length of each of the image capturing optical systems 111a and 111b provided in the sub image capturer 110 is 18.2 mm, the pixel pitch of the image sensor 112 is 1.34 μm, and the diagonal length of each of the image reading areas Ra and Rb is 1.97 mm. Further, the focal length of the image capturing optical system 101 is 1750 mm in 35 mm equivalent focal length, and the focal length of the image capturing optical systems 111a and 111b is 400 mm in 35 mm equivalent focal length. When each parameter of the main image capturer 100 and the sub image capturer 110 is substituted into conditional expression (9), a value of 0.009 is obtained, which satisfies conditional expression (9). In the image capturing optical systems 111a and 111b of the sub image capturer 110, the distance from the final surface of the lens except for the prism to the image sensor 112 is 22.8 mm, while the distance from the rear principal point position to the image sensor 112 (i.e., the focal length) is 18.2 mm.

As described above, each of the image capturing optical systems 111a and 111b constituting the sub image capturer 110 of this embodiment includes at least two reflection members (prisms P1a and P2a or prisms P1b and P2b). Further, the lens closest to the object of the lens units of each of the image capturing optical systems 111a and 111b has a negative refractive power. Therefore, the image capturing apparatus that satisfies conditional expression (9) can be realized. Accordingly, it is possible to achieve both of the deep depth of field and calculation of the object distance in the dark imaging environment while maintaining high distance calculation accuracy.

Figure 6:
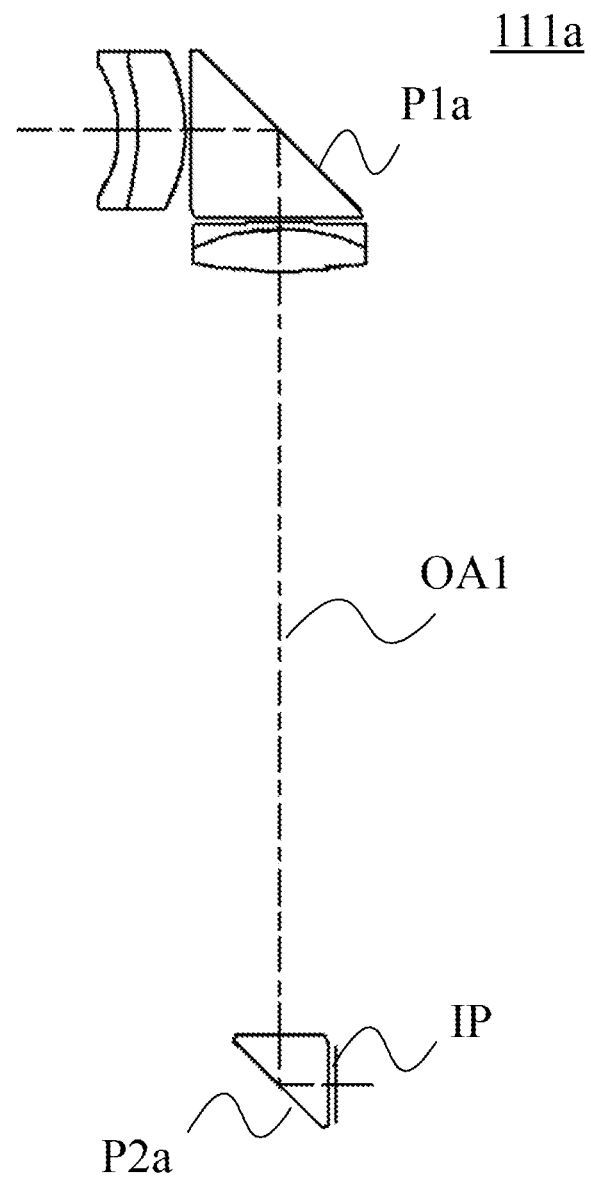
FIG. 6 is a cross-sectional view of an image capturing optical system of the sub image capturer in Embodiment 1.
Figure 7:
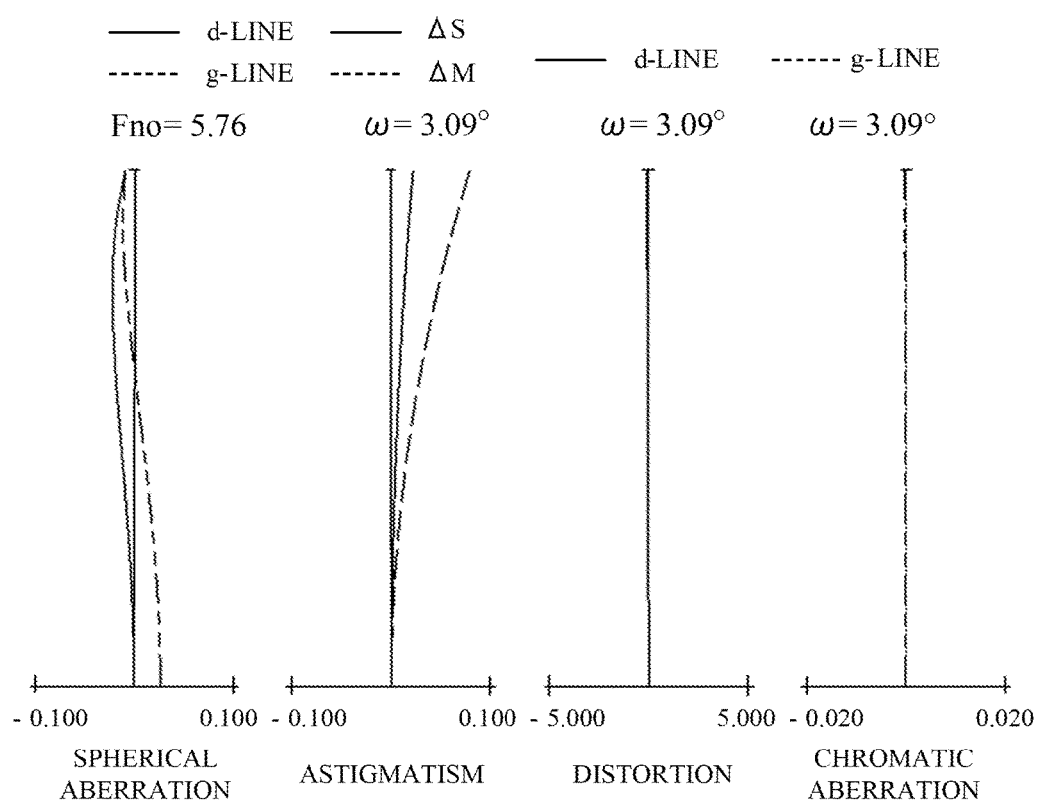
FIG. 7 is an aberration diagram of the image capturing optical system of the sub image capturer in Embodiment 1.

Subsequently, referring to FIG. 6, a lens cross section of the image capturing optical system 111a of the sub image capturer 110 will be described. FIG. 6 is a cross-sectional view of the image capturing optical system 111a. In the cross-sectional view of FIG. 6, the left side is an object side (front side) and the right side is an image side (rear side). An image plane IP corresponds to an imaging plane of the image sensor (photoelectric conversion element) 112 such as a CCD sensor and a CMOS sensor. The image capturing optical system 111b also has the same configuration as the image capturing optical system 111a illustrated in FIG. 6. FIG. 7 is an aberration diagram of the image capturing optical system 111a. In the aberration diagram of FIG. 7, symbols d and g are d line and g line, and symbols ΔM and ΔS are a meridional image plane and a sagittal image plane, respectively. A chromatic aberration of magnification is represented by g line. Symbol ω is a half angle of field, and symbol Fno is an F number.

Figure 8:
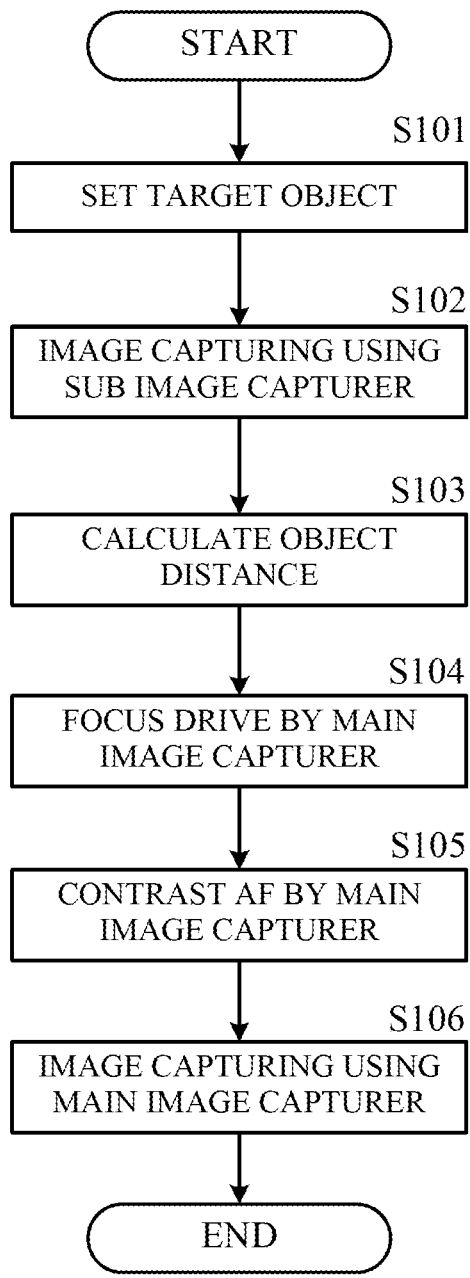
FIG. 8 is a flowchart illustrating an operation of the image capturing apparatus in Embodiment 1.

Next, referring to FIG. 8, an image capturing procedure of the image capturing apparatus 1 will be described. FIG. 8 is a flowchart illustrating an operation (image capturing operation) of the image capturing apparatus 1. Each step of FIG. 8 is mainly performed by each part of the image capturing apparatus 1 based on a command (instruction) from the system controller 30.

First, at step S101, the system controller 30 sets the object selected by the user via the input unit 50 as a target object. When the object is not selected, the system controller 30 sets the object existing in the predetermined area as the target object. This area is, for example, an area corresponding to the center of the angle of field of the main image capturer 100, but the present invention is not limited thereto. Further, the system controller 30 acquires an image capturing condition (image capturing condition information) input by the user via the input unit 50. The image capturing condition includes the F number or the ISO sensitivity of the main image capturer 100, and the like, but the present invention is not limited thereto.

Subsequently, at step S102, the system controller 30 controls the sub image capturer 110 via the image capturing controller 40 to perform image capturing by using the sub image capturer 110 to obtain two images obtained via the image capturing optical systems 111a and 111b. Subsequently, at step S103, the image processor 20 calculates the object distance in an overlapped area of the angles of field of the image capturing optical systems 111a and 111b by using the two images acquired at step S102 to generate a distance map image. The image processor 20 may calculate the object distance set as the target object at step S101 by using the two images acquired at step S102.

Subsequently, at step S104, the system controller 30 drives the focus lens 101F of the main image capturer 100 via the image capturing controller 40. At this time, the system controller 30 focuses the image capturing optical system 101 on the target object based on the distance (object distance) of the target object calculated at step S103. Further, the system controller 30 controls the aperture stop 101A and the image sensor 102 provided in the main image capturer 100 via the image capturing controller 40, and it sets the image capturing condition acquired at step S101.

Subsequently, at step S105, the system controller 30 performs a known contrast AF by using an output signal of the image sensor 102 provided in the main image capturer 100. Specifically, the system controller 30 evaluates a contrast value of the image acquired by using the image sensor 102 while slightly changing a position of the focus lens 101F via the image capturing controller 40. Then, the system controller 30 acquires the position of the focus lens 101F where the contrast value is maximized to determine an in-focus state. Step S105 is a preliminary step performed when it is not possible to calculate the object distance with sufficient accuracy at step S103 and may be omitted. Specifically, "when the object distance with sufficient accuracy cannot be calculated" means that the target object is located at a distance outside the depth of field of the image capturing optical systems 111a and 111b provided in the sub image capturer 110.

Subsequently, at step S106, the system controller 30 controls the main image capturer 100 via the image capturing controller 40 to perform image capturing to acquire an image. The image acquired at this time is stored in the image recording medium 60, and then the image capturing procedure ends. In this embodiment, in addition to the image, two images acquired by the sub image capturer 110 may be stored in the image recording medium 60, or the distance map image calculated by the image processor 20 using the two images may be stored in the recording medium 60.

As described above, in the image capturing apparatus of this embodiment, the refractive power of the lens closest to the object among the lens units of the two image capturing optical systems of the sub image capturer is negative. Further, each of the two image capturing optical systems includes two reflection members. Accordingly, it is possible to provide the image capturing apparatus including the sub image capturer having a short focal length and a long base length, and capable of focusing with high accuracy and at high speed over a wide distance range.

Embodiment 2

Figure 9:
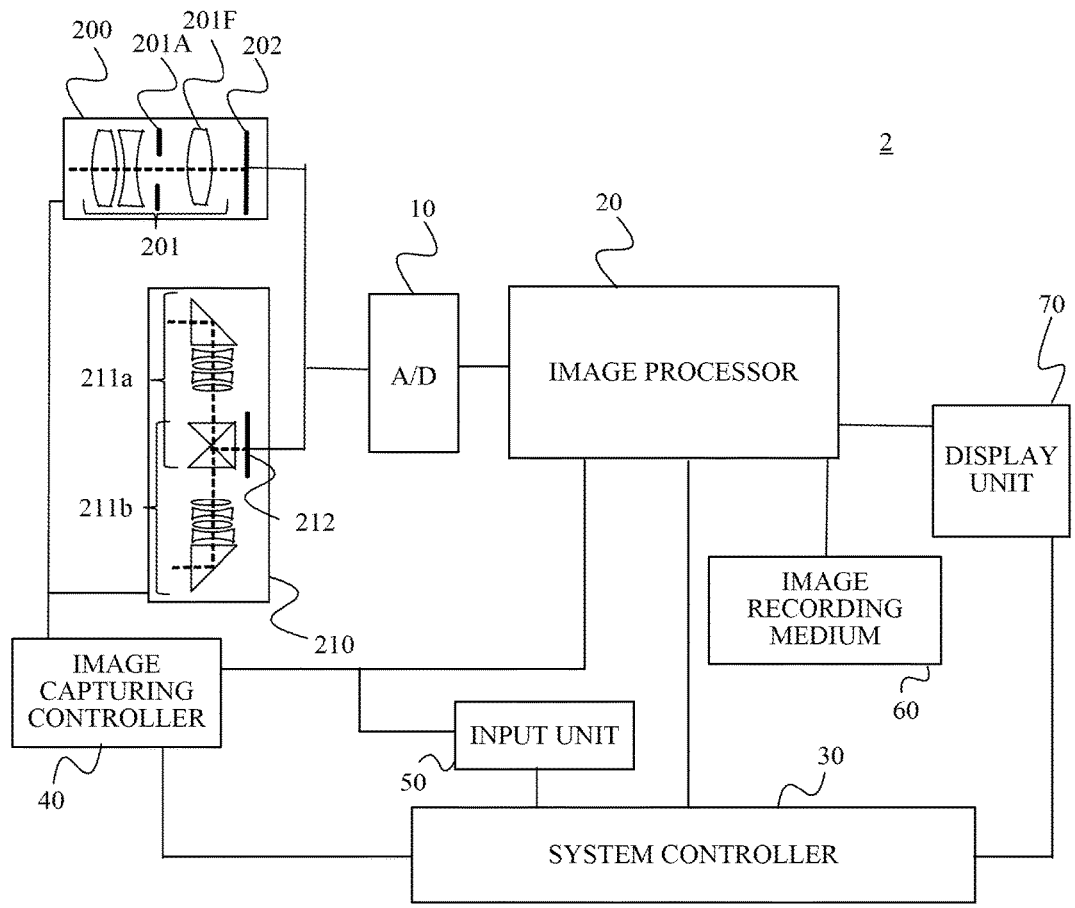
FIG. 9 is a block diagram of an image capturing apparatus in Embodiment 2.

Next, referring to FIG. 9, an image capturing apparatus 2 in Embodiment 2 of the present invention will be described. FIG. 9 is a block diagram of the image capturing apparatus 2. The image capturing apparatus 2 includes a main image capturer 200 that is mainly used for capturing an image of an object and a sub image capturer 210 that acquires a distance of the object. The elements of the image capturing apparatus 2 other than the main image capturer 200 and the sub image capturer 210 are the same as those of the image capturing apparatus 1 of Embodiment 1, and therefore descriptions thereof will be omitted. The elements of the main image capturer 200 and the sub image capturer 210 are respectively the same as the main image capturer 100 and the sub image capturer 110 provided in the image capturing apparatus 1 of Embodiment 1 except for some parts of them, and accordingly this embodiment will only describe different points. The image capturing optical system 201 provided in the main image capturer 200 is a fixed focal image capturing optical system. Preferably, an angle of field of each of the image capturing optical systems 211a and 211b is larger than twice the angle of field of the image capturing optical system 201.

Figure 10A:
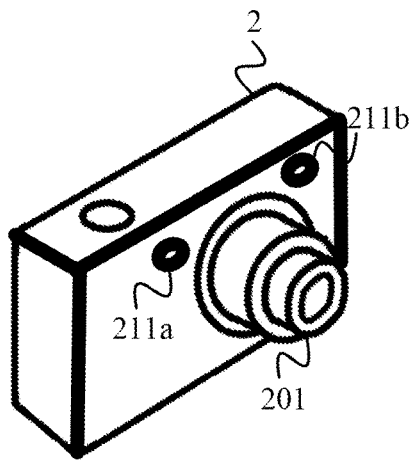
FIGS. 10A and 10B are external views of the image capturing apparatus in Embodiment 2.
Figure 10B:
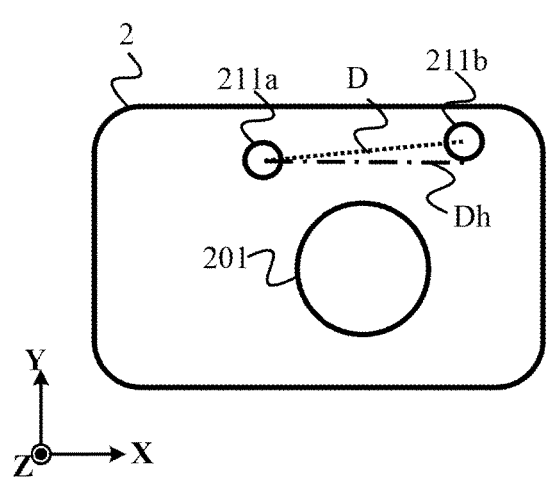

FIGS. 10A and 10B are external views of the image capturing apparatus 2, and FIGS. 10A and 10B illustrate a top view and a front view, respectively. FIGS. 10A and 10B illustrate only a lens closest to the object in the image capturing optical system 201 and a prism closest to the object in the image capturing optical systems 211a and 211b. While the two image capturing optical systems 111a and 111b provided in the sub image capturer 110 are arranged such that the base length D is parallel to the X axis in the image capturing apparatus 1 of Embodiment 1, the base length D is arranged such that the base length D is inclined at a predetermined angle with respect to the X axis in the image capturing apparatus 2 of this embodiment. As illustrated in FIG. 10B, a line segment obtained by projecting the base length D onto the X axis is denoted by Dh. The image capturing optical systems 211a and 211b are arranged such that the line segment Dh is 50 mm. In this embodiment, when calculating the object distance using the parallax amount in the X axis direction, the line segment Dh is regarded as a base line (base length).

FIGS. 11A to 11C are configuration diagrams of the sub capturer 210, FIG. 11A is plan view of the sub image capturer 210, FIG. 11B is a front view of the image sensor (second image sensor) 212, and FIG. 11C is a perspective view of the image sensor 212 and the prisms P2a and P2b. The image capturing optical system (second image capturing optical system) 211a includes four lenses and two prisms P1a and P2a. Similarly, the image capturing optical system (third image capturing optical system) 211b includes four lenses and two prisms P1b and P2b. The image capturing optical systems 211a and 211b have the same configuration and are disposed so as to be rotationally symmetrical with respect to a line that passes through the center of the image sensor 212 and that is parallel to the Z axis.

In the sub image capturer 110 of the image capturing apparatus 1, the prisms P2a and P2b of the two image capturing optical systems 111a and 111b, which are close to the image sensor 112, are disposed so as to be parallel to the base line D (i.e., the prisms P2a and P2b are arranged along the X axis). On the other hand, in the sub image capturer 210 of the image capturing apparatus 2, the prisms P2a and P2b are disposed so as to be perpendicular to the base line (a line segment Dh obtained by projecting the base length D in the X direction) (i.e., the prisms P2a and P2b are arranged along the Y axis).

In FIG. 11B, the line segment Dh obtained by projecting the base line D in the X direction is indicated by a dashed-dotted line. In FIG. 11B, the image circle of the image capturing optical system 211a is denoted by ICa, the intersection between the optical axis OA1 and the image sensor 212 is denoted by OCa, and the image reading region is denoted by Ra. In FIG. 11B, the image circle of the image capturing optical system 211b is denoted by ICb, the intersection between the optical axis OA2 and the image sensor 212 is denoted by OCb, and the image reading region is denoted by Rb.

In the image capturing optical systems 211a and 211b, a line connecting the intersection points OCa and OCb of the optical axes OA1 and OA2 and the image sensor 212 is arranged so as to be substantially perpendicular to the line segment Dh. Further, the image sensor 212 is arranged such that its short side is substantially parallel to the line segment Dh and its long side is substantially perpendicular to the line segment Dh. That is, the line segment Dh is the longest line segment among line segments obtained by projecting the base line D onto each side of the image sensor 212. Preferably, the longest line segment among the line segments obtained by projecting the base line D parallel to each side of the image sensor 212 is longer than the length twice as long as the focal length of each of the image capturing optical systems 211a and 211b.

In FIG. 11C, the prisms P2a and P2b of the image capturing optical systems 211a and 211b, which are close to the image sensor 212, are illustrated, and the dashed-dotted lines indicate the optical axes OA1 and OA2 of the image capturing optical systems 211a and 211b, respectively. Since the two prisms P2a and P2b are disposed side by side in the Y direction as described above, the line connecting the intersections OCa and OCb of the optical axes OA1 and OA2 of the image capturing optical systems 211a and 211b and the image sensor 212 and the line segment Dh can be substantially perpendicular to each other. Hereinafter, this arrangement is called a vertical arrangement of prisms.

Unlike the sub image capturer 110 of Embodiment 1, the sub image capturer 210 of this embodiment includes a focus mechanism (not illustrated). Specifically, the image sensor 212 is held by the focus mechanism, and it is controlled by the image capturing controller 40 to be driven in the Z direction. Generally, an error (rotation error) in which the image sensor 212 rotates about the Y axis or the X axis occurs as the image sensor 212 is driven in the Z direction. Hereinafter, this rotation error is called an inclination error of the image sensor. The sub image capturer 210 of this embodiment has a feature in which it is hardly affected by this inclination error by adopting the vertical arrangement of the prisms.

Figure 12A:
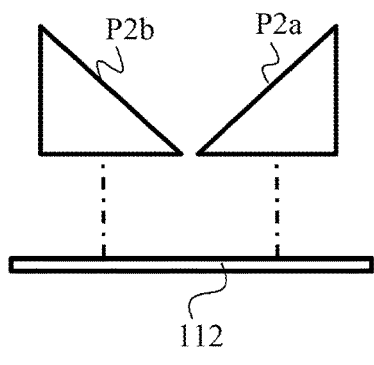
FIGS. 12A to 12D are diagrams illustrating a relationship between an arrangement of a prism and an inclination error of an image sensor in each embodiment.
Figure 12B:
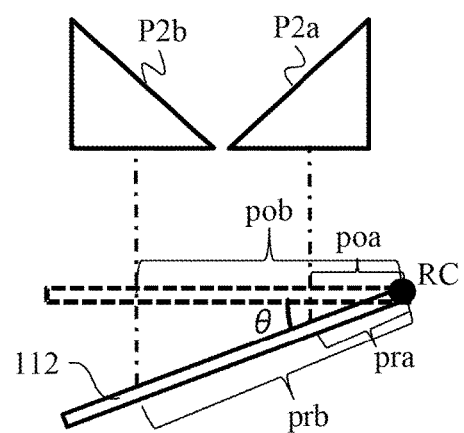

Here, referring to FIGS. 12A to 12D, the relationship between the prism arrangement and the inclination error will be described in detail. FIGS. 12A to 12D are diagrams illustrating the relationship between the arrangement of the prisms and the inclination error of the image sensor. FIG. 12A illustrates a lateral arrangement of the prisms, that is, the prisms P2a and P2b and the image sensor 112 of Embodiment 1. FIG. 12B illustrates a state where the sub image capturer 110 of the image capturing apparatus 1 virtually has the same focus mechanism as that of the sub image capturer 210, and the inclination error around the Y axis occurs in the image sensor 112 as a result of the focus drive. In addition, it illustrates the position of the image sensor 112 in the case where the inclination does not occur as indicated by a dotted line. It is assumed that the center of the inclination and the origin of the coordinate are denoted to as RC and the coordinates of the intersections of the optical axes of the respective image capturing optical systems and the image sensor 112 in the absence of the inclination are denoted by poa and pob. It is assumed that the coordinates of the intersections between the optical axes of the respective image capturing optical systems and the image sensor 112 when the image sensor 112 is inclined θ degrees are denoted pra and prb. At this time, the difference Δpa between the coordinate poa and the coordinate pra is represented by expression (13) below, and the difference Δpb between the coordinate pob and the coordinate prb is represented by expression (14) below.

$$\Delta pa = poa\left(\frac{1}{\cos\theta} - 1\right) \quad (13)$$

$$\Delta pb = pob\left(\frac{1}{\cos\theta} - 1\right) \quad (14)$$

As the image sensor is inclined, the positions of the object image on which the respective image capturing optical systems form an image change by the difference Δpa and Δpb. At this time, when the differences Δpa and Δpb are different from each other, the difference and the parallax amount cannot be separated, so that an erroneous parallax amount is acquired and a large distance error occurs for calculation of the object distance.

Figure 12C:
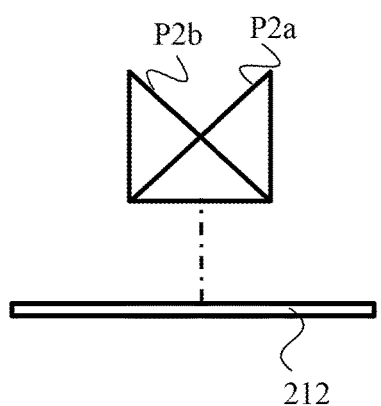
Figure 12D:
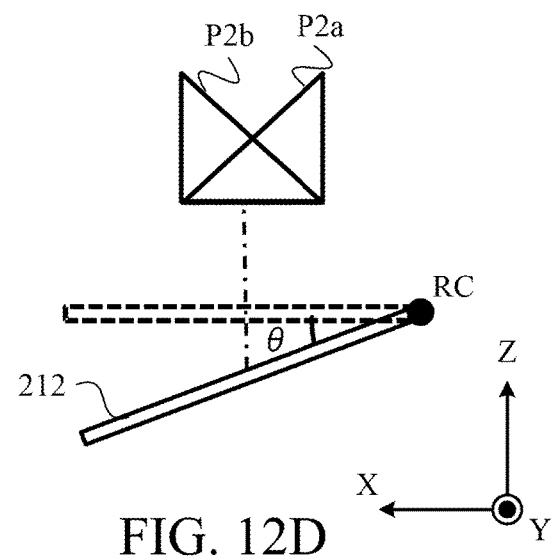

Subsequently, the influence of the inclination of the image sensor in the case of the horizontal arrangement like the sub image capturer 210 of this embodiment will be described. FIG. 12C illustrates the vertical arrangement of the prisms, that is, the prisms P2a and P2b and the image sensor 212 of the sub image capturer 210 of this embodiment. FIG. 12D illustrates a state where the inclination error centered on the Y axis occurs in the image sensor 212 as a result of the focus drive, and at the same time, it illustrates the position of the image sensor 212 in the case where the inclination does not occur as indicated by a dotted line. The definitions of the inclination center RC and the coordinates poa, pra, pob, and prb are the same as those in FIG. 12B. In FIG. 12D, although the coordinates poa, pra, pob, and prb are not explicitly illustrated, poa=pob, pra=prb and Δpa=Δpb are satisfied. Therefore, even if the image sensor is inclined around the Y axis, no error occurs in the calculation of the object distance since the differences Δpa and Δpb are equal to each other. When the image sensor is inclined around the X axis, the object position change that cannot be separated from the parallax in the Y direction occurs in the Y direction, but there is no problem in the calculation of the object distance since the direction in which the base line can be taken long, that is, the parallax amount in the X direction is used (at this time, the base length corresponds to the line segment Dh).

As described above, by disposing the prisms in the vertical arrangement of the prism, that is, by disposing the prisms in a direction perpendicular to the X projection (line segment Dh) of the base line, the influence of the inclination of the image sensor can be reduced. As a result, it is possible to perform focus drive of the image sensor while maintaining high calculation precision of the object distance.

The focal length of the image capturing optical system 201 provided in the main image capturer 200 is 535 mm, the F number is 1.2, the size of the image sensor 202 is 1/2.3 type (that is, the diagonal length is 7.7 mm), and the pixel pitch is 1 μm. The focal length of each of the image capturing optical systems 211a and 211b provided in the sub image capturer 210 is 18.2 mm, the pixel pitch of the image sensor 212 is 1.34 μm, and the diagonal length of each of the image reading areas Ra and Rb is 1.97 mm. Further, the focal length of the image capturing optical system 201 is 3000 mm in 35 mm equivalent focal length, and the focal length of the image capturing optical systems 211a and 211b is 400 mm in 35 mm equivalent focal length. When each parameter of the main image capturer 200 and the sub image capturer 210 is substituted into conditional expression (8), a value of 0.0028 is obtained, which satisfies conditional expression (8). In the image capturing optical systems 211a and 211b of the sub image capturer 210, the distance from the final surface of the lens except for the prism to the image sensor 212 is 19.7 mm, while the distance from the rear principal point position to the image sensor 212 (i.e., the focal length) is 18.2 mm.

As described above, each of the image capturing optical systems 211a and 211b constituting the sub image capturer 210 of this embodiment includes at least two reflection members, and the lens closest to the object has the negative refractive power. Therefore, the image capturing apparatus satisfying conditional expression (8) can be realized. As a result, it is possible to achieve both deep depth of field and calculation of the object distance in the dark imaging environment while maintaining high ranging accuracy (i.e., high calculation accuracy of the object distance).

Figure 13:
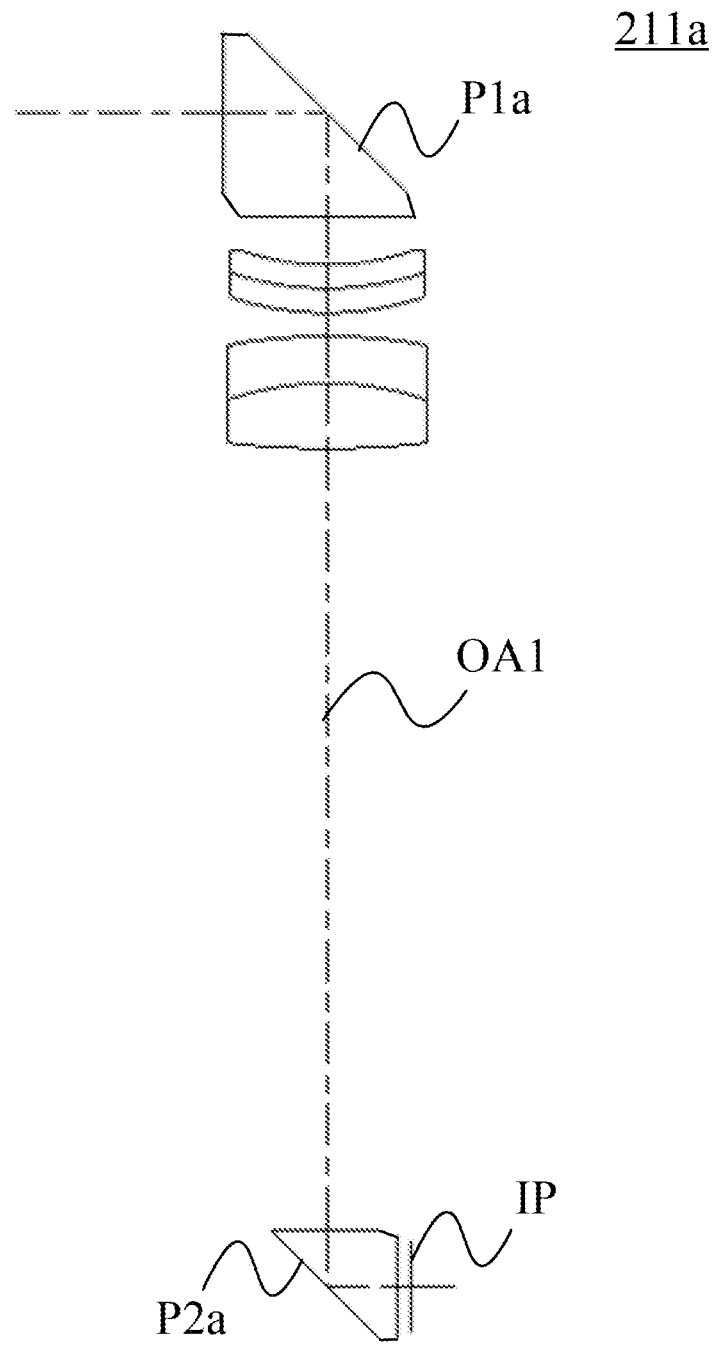
FIG. 13 is a cross-sectional view of an image capturing optical system of the sub image capturer in Embodiment 2.
Figure 14:
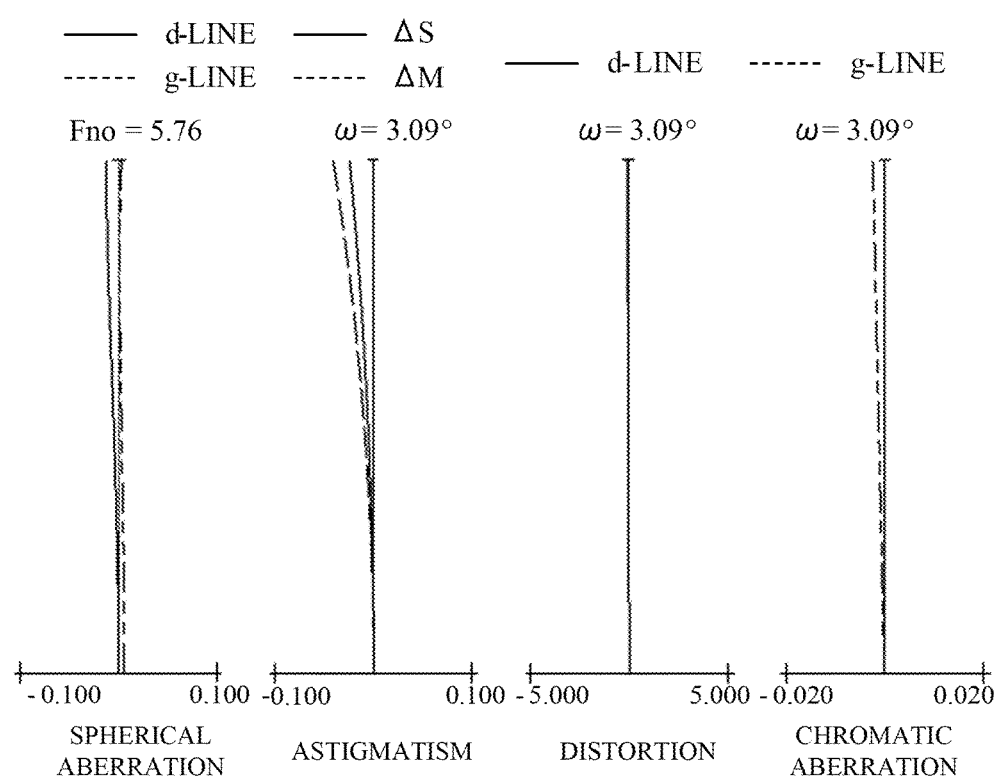
FIG. 14 is an aberration diagram of the image capturing optical system of the sub image capturer in Embodiment 2.

Subsequently, referring to FIG. 13, the lens cross section of the image capturing optical system 211a of the sub image capturer 210 will be described. FIG. 13 is a cross-sectional view of the image capturing optical system 211a. In the cross-sectional view of FIG. 13, the left side is the object side (front side) and the right side is the image side (rear side). An image plane IP corresponds to an imaging plane of the image sensor 112 (photoelectric conversion element) such as a CCD sensor and a CMOS sensor. FIG. 14 is an aberration diagram of the image capturing optical system 211a. In the aberration diagram of FIG. 14, symbols d and g are d line and g line, respectively, and symbols ΔM and ΔS are a meridional image plane and a sagittal image plane, respectively. A chromatic aberration of magnification is represented by the g line. Symbol ω is a half angle of field, and symbol Fno is an F number.

Figure 15:
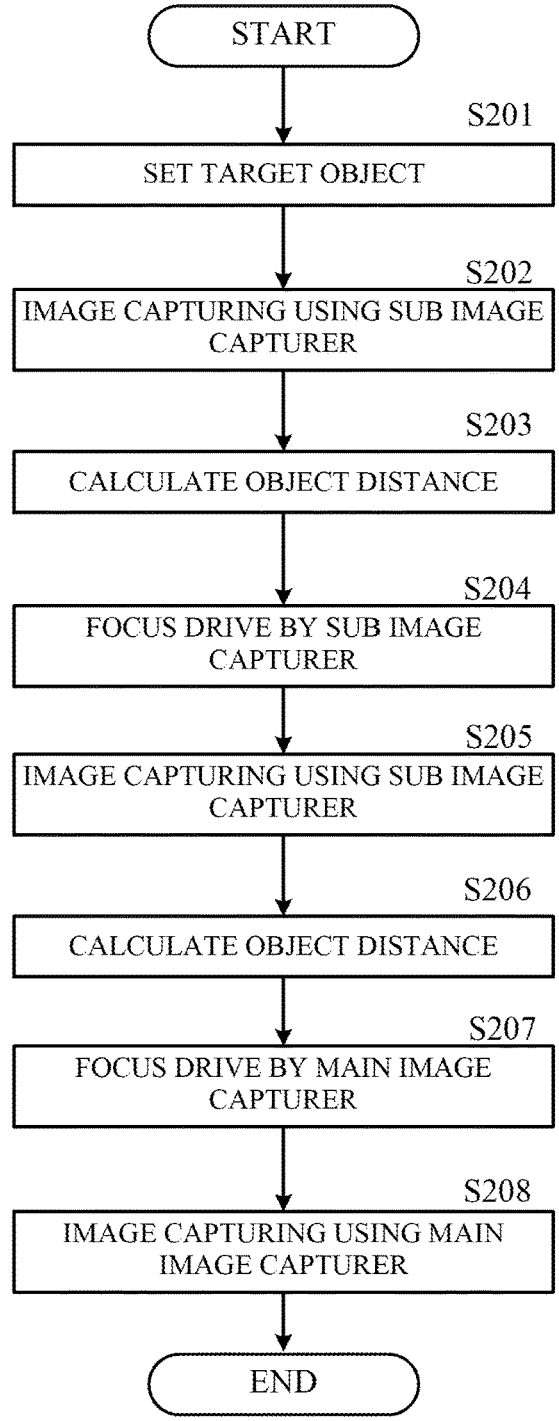
FIG. 15 is a flowchart illustrating an operation of the image capturing apparatus in Embodiment 2.

Next, referring to FIG. 15, the image capturing procedure of the image capturing apparatus 2 will be described. FIG. 15 is a flowchart illustrating the operation (image capturing operation) of the image capturing apparatus 2. Each step of FIG. 15 is mainly performed by each part of the image capturing apparatus 2 based on an instruction (command) from the system controller 30. Steps S201 to S203 of FIG. 15 are the same as steps S101 to S103 of FIG. 8, respectively, and descriptions thereof will be omitted.

Subsequently, at step S204, the system controller 30 drives the image sensor 212 of the sub image capturer 210 on the Z axis via the image capturing controller 40 to focus the image capturing optical systems 211a and 211b on the target object based on the distance (object distance) of the target object. Subsequent steps S205 and S206 are the same as steps S202 and S203, respectively, and descriptions thereof will be omitted. Subsequent step S207 is the same as step S104, and step S208 is the same as step S106, and thus description thereof will be omitted.

The image capturing apparatus 2 of this embodiment calculates the object distance using the sub image capturer 210 twice in total at steps S202 and S203 and at steps S205 and S206. This is because in the initial state, it is assumed that the target object exists outside the depth of field of the sub image capturer 210. That is, in the first operation, the low-precision object distance calculation is performed using an out-of-focus image acquired by the sub image capturer 210 to focus the sub image capturer 210, and in the second operation, the high-precision object distance calculation is performed using an in-focus image acquired by the sub image capturer 210 to focus the main image capturer 200. In this embodiment, when the object distance with sufficient accuracy can be calculated in the first operation, steps S204 to S206 may be omitted.

As described above, in the image capturing apparatus of this embodiment, the refractive index of the lens closest to the object in the image capturing optical system provided in the sub image capturer is negative, and each of the image capturing optical systems includes at least two reflection members. In addition, the prisms of each image capturing optical system are disposed in the vertical arrangement. Therefore, it is possible to provide the image capturing apparatus including the sub image capturer having a short focal length and a long base length, and capable of focusing with high accuracy and at high speed over a wide distance range.

Embodiment 3

Next, an image capturing apparatus in Embodiment 3 of the present invention will be described. Since the configuration of the image capturing apparatus of this embodiment is the same as that of the image capturing apparatus 2 of Embodiment 2 except for a part thereof, only differences therebetween will be described. A main image capturer of this embodiment includes an image capturing optical system and an image sensor. A sub image capturer of this embodiment includes two image capturing optical systems and an image sensor 312 common to these image capturing optical systems. The two image capturing optical systems are the same as the image capturing optical systems 211a and 211b of Embodiment 2. In this embodiment, the two image capturing optical systems are arranged so that a line segment Dh (i.e., a line segment obtained by projecting the base length D onto the X axis) is 52.1 mm.

FIG. 16A is a front view of the image sensor 312 provided in the sub image capturer of this embodiment. In FIG. 16A, a line segment Dh obtained by projecting the base length D in the X direction is indicated by a dashed-dotted line. In FIG. 16A, the image circle of one image capturing optical system of the sub image capturer is denoted by ICa, the intersection between the optical axis and the image sensor 312 is denoted by OCa, and the image reading area is denoted by Ra. In addition, the image circle of the other image capturing optical system of the sub image capturer is denoted by ICb, the intersection between the optical axis and the image sensor 312 is denoted by OCb, and the image reading area is denoted by Rb. In this manner, an angle formed by the line segment Dh and the line connecting the intersections OCa and OCb between the respective optical axes of the two image capturing optical systems and the image sensor 312 is θ=degrees (or 45 degrees or more). In this embodiment, an angle between the line connecting the points where the optical axes of the two image capturing optical systems (second image capturing optical system and third image capturing optical system) and the plane of the second image sensor cross each other, and the longest line segment among line segments obtained by projecting the base line to be parallel to each side of the second image sensor is 45 degrees or more. The prisms P2a and P2b provided in the image capturing optical system of the sub image capturer are not arranged in the vertical arrangement, but the length of the line segment obtained by projecting the line segment between the intersections OCa and OCb on the line segment Dh is smaller than that in the horizontal arrangement, and accordingly it is less susceptible to the influence of the inclination error of the image sensor.

The focal length of the image capturing optical system provided in the main image capturer is 178 mm, the F number is 11, the size of the image sensor is 1/2.3 type (that is, the diagonal length is 7.7 mm), and the pixel pitch is 2.0 m. The focal length of each of the image capturing optical systems provided in the sub image capturer is 18.2 mm, the pixel pitch of the image sensor 312 is 1.34 μm, and the diagonal length of each of the image reading areas Ra and Rb is 1.97 mm. Further, the focal length of the image capturing optical system of the main image capturer is 1000 mm in 35 mm equivalent focal length, and the focal length of each of the image capturing optical system in the sub image capturer is 400 mm in 35 mm equivalent focal length. When each parameter of the main image capturer and the sub image capturer is substituted into conditional expression (8), a value of 0.49 is obtained, which satisfies conditional expression (8).

Each of the image capturing optical systems constituting the sub image capturer of this embodiment includes at least two reflection members, and the lens closest to the object has the negative refractive power. Therefore, the image capturing apparatus satisfying conditional expression (8) can be realized. As a result, it is possible to achieve both deep depth of field and high ranging accuracy (calculation accuracy of the object distance).

Embodiment 4

Next, an image capturing apparatus in Embodiment 4 of the present invention will be described. Since the configuration of the image capturing apparatus of this embodiment is the same as that of the image capturing apparatus 2 of Embodiment 2 except for a part thereof, only the differences will be described. The main image capturer of this embodiment includes an image capturing optical system and an image sensor. A sub image capturer of this embodiment includes two image capturing optical systems and an image sensor 412 common to these image capturing optical systems. The two image capturing optical systems are the same as the image capturing optical systems 211a and 211b of Embodiment 2. In this embodiment, the two image capturing optical systems are disposed so that a line segment Dh (i.e., a line segment obtained by projecting the base length D onto the X axis) is 51.5 mm.

FIG. 16B is a front view of the image sensor 412 provided in the sub image capturer of this embodiment. In FIG. 16B, the line segment Dh obtained by projecting the base length D in the X direction is indicated by a dashed-dotted line. In FIG. 16A, the image circle of one image capturing optical system of the sub image capturer is denoted by ICa, the intersection between the optical axis and the image sensor 412 is denoted by OCa, and the image reading area is denoted by Ra. Further, the image circle of the other image capturing optical system of the sub image capturer is denoted by ICb, the intersection between the optical axis and the image sensor 412 is denoted by OCb, and the image reading area is denoted by Rb. In this manner, an angle between the line segment Dh and the line connecting the intersections OCa and OCb of the respective optical axes of the two image capturing optical systems and the image sensor 412 is θ=30 degrees. The prisms P2a and P2b provided in the image capturing optical system of the sub image capturer are not disposed in the vertical arrangement, but the length of the line segment obtained by projecting the line segment between the intersections OCa and OCb on the line segment Dh is smaller than that in the horizontal arrangement, and accordingly it is less susceptible to the influence of the inclination error of the image sensor.

The focal length of the image capturing optical system provided in the main image capturer is 214 mm, the F number is 5.6, the size of the image sensor is 1/2.3 type (that is, the diagonal length is 7.7 mm), and the pixel pitch is 1.34 μm. The focal length of each of the image capturing optical systems provided in the sub image capturer is 18.2 mm, the pixel pitch of the image sensor 412 is 1.34 μm, and the diagonal length of each of the image reading areas Ra and Rb is 1.97 mm. Further, the focal length of the image capturing optical system of the main image capturer is 1200 mm in 35 mm equivalent focal length, and the focal length of each of the image capturing optical system in the sub image capturer is 400 mm in 35 mm equivalent focal length. When each parameter of the main image capturer and the sub image capturer is substituted into conditional expression (9), a value of 0.11 is obtained, which satisfies conditional expression (9).

Each of the image capturing optical systems constituting the sub image capturer of this embodiment includes at least two reflection members, and the lens closest to the object has the negative refractive power. Therefore, the image capturing apparatus satisfying conditional expression (8) can be realized. As a result, it is possible to achieve both deep depth of field and high ranging accuracy (calculation accuracy of the object distance).

While the image capturing optical system of the sub image capturer includes the lens and the reflection member in each embodiment, a reflection type imaging optical system constituted only by a reflection member may be adopted. While each of the image capturing optical systems constituting the sub image capturer includes the two reflection members in each embodiment, it may include three or more reflection members.

Hereinafter, specific numerical data of Numerical embodiment 1 corresponding to Embodiment 1 (image capturing optical systems 111a and 111b) and Numerical embodiment 2 corresponding to each of Embodiments 2 to 4 (image capturing optical systems 211a and 211b) are described. In each numerical embodiment, symbol i denotes the number of the surface counted from the object side. The prism is described separately by three faces of an entrance surface, a reflection surface, and an exit surface. Symbol ri is a radius of curvature of the i-th optical surface (i-th surface). Symbol di is an axial distance between the i-th surface and the (i+1)th surface. Symbols ndi and vdi are a refractive index and the Abbe number of a material of the i-th optical member for the d line, respectively. A front principal point position and the entrance pupil position are indicated by coordinates with a first surface as a reference, and a rear principal point position and the exit pupil position are indicated by coordinates with a final surface as a reference.

Table 1 indicates the relationship between conditional expressions (10) to (12) and each numerical embodiment. In each conditional expression, the focal lengths of the four lenses are assigned to f1, f2, f3, and f4 in order from the lens closest to the object on the optical axis.

Numerical Embodiment 1

| Unit mm | | | | | |
|---|---|---|---|---|---|
| Surface Data | | | | | |
| Surface Number | r | d | nd | vd | Effective Diameter |
| 1 | −3.354 | 0.52 | 1.51633 | 64.1 | 3.20 |
| 2 | −6.622 | 1.25 | 1.63980 | 34.5 | 3.40 |
| 3 | −4.360 | | | | 3.83 |
| 4 | ∞ | 2.30 | 1.84666 | 23.8 | 3.88 |
| 5 | ∞ | 2.30 | 1.84666 | 23.8 | 5.52 |
| 6 | ∞ | 0.11 | | | 4.11 |

-continued

| Unit mm | | | | | |
|---|---|---|---|---|---|
| 7 | 57.114 | 0.15 | 1.68893 | 31.1 | 4.12 |
| 8 | 5.133 | 1.12 | 1.60738 | 56.8 | 4.13 |
| 9 | −12.156 | 20.02 | | | 4.17 |
| 10 | ∞ | 1.30 | 1.84666 | 23.8 | 2.15 |
| 11 | ∞ | 1.30 | 1.84666 | 23.8 | 3.03 |
| 12 | ∞ | | | | 2.01 |
| Image plane | ∞ | | | | |

| | |
|---|---|
| Focal length | 18.20 |
| F number | 5.76 |
| Angle of field | 3.09 |
| Image height | 0.98 |
| Total lens length | 30.73 |
| BF | 0.22 |
| d3 | 0.15 |
| d12 | 0.15 |
| Entrance pupil position | 0.00 |
| Exit pupil position | 27.70 |
| Front principal point position | −6.31 |
| Rear principal point position | 18.05 |

| Single lens data | | |
|---|---|---|
| Lens | Start surface | Focal length |
| 1 | 1 | −13.91 |
| 2 | 2 | 16.42 |
| 3 | 7 | −8.20 |
| 4 | 8 | 6.09 |

Numerical Embodiment 2

| Unit mm | | | | | |
|---|---|---|---|---|---|
| Surface Data | | | | | |
| Surface Number | r | d | nd | vd | Effective Diameter |
| 1 (stop) | ∞ | 2.20 | 1.84666 | 23.8 | 3.16 |
| 2 | ∞ | 2.20 | 1.84666 | 23.8 | 4.51 |
| 3 | ∞ | 1.03 | | | 3.41 |
| 4 | −5.627 | 0.50 | 1.53775 | 74.7 | 3.49 |
| 5 | −6.460 | 0.52 | 1.63980 | 34.5 | 3.65 |
| 6 | −6.435 | | | | 3.80 |
| 7 | 12.080 | 1.00 | 1.69895 | 30.1 | 3.92 |
| 8 | 6.496 | 1.39 | 1.51633 | 64.1 | 3.85 |
| 9 | −18.681 | 16.66 | | | 3.85 |
| 10 | ∞ | 1.20 | 1.84666 | 23.8 | 2.14 |
| 11 | ∞ | 1.50 | 1.84666 | 23.8 | 3.02 |
| 12 | ∞ | | | | 1.99 |
| Image plane | ∞ | | | | |

| | |
|---|---|
| Focal length | 18.20 |
| F number | 5.77 |
| Angle of field | 3.09 |
| Image height | 0.98 |
| Total lens length | 29.00 |
| BF | 0.30 |
| d6 | 0.50 |
| d12 | 0.30 |
| Entrance pupil position | 0.00 |
| Exit pupil position | 27.02 |
| Front principal point position | −6.08 |
| Rear principal point position | 17.90 |

| Single lens data | | |
|---|---|---|
| Lens | Start surface | Focal length |
| 1 | 4 | −102.70 |
| 2 | 5 | 282.16 |
| 3 | 7 | −21.70 |
| 4 | 8 | 9.51 |

TABLE 1

| | NUMERICAL EMBODIMENT 1 | NUMERICAL EMBODIMENT 2 |
|---|---|---|
| CONDITIONAL EXPRESSION (10) | −0.8472 | −0.3640 |
| CONDITIONAL EXPRESSION (11) | −1.3456 | −2.2811 |
| CONDITIONAL EXPRESSION (12) | 0.6296 | 0.1596 |

According to each embodiment, it is possible to provide an image capturing apparatus and an image capturing unit capable of focusing with high accuracy and at high speed over a wide distance range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-041261, filed on Mar. 6, 2017, which is hereby incorporated by reference herein in its entirety.

What is claimed is:
1. An image capturing apparatus comprising:
a first image capturer including a first image capturing optical system and a first image sensor; and
a second image capturer including a second image capturing optical system and a third image capturing optical system with different viewpoints from each other and a second image sensor,
wherein an angle of field of each of the second image capturing optical system and the third image capturing optical system is larger than an angle of field of the first image capturing optical system,
wherein each of the second image capturing optical system and the third image capturing optical system includes at least two reflection members configured to introduce light from an object to the second image sensor, and
wherein a conditional expression below is satisfied:

$$0.5 > \frac{Df_s}{p_s} \frac{F_m p_m}{f_m^2} > 0.001$$

where $f_m$ is a focal length of the first image capturing optical system, $F_m$ is an F number of the first image capturing optical system, $p_m$ is a pixel pitch of the first image sensor, $f_s$ is a focal length of each of the second image capturing optical system and the third image capturing optical system, $p_s$ is a pixel pitch of the second image sensor, and D is a base line of the second image capturer.

2. The image capturing optical system according to claim 1, wherein the angle of field of each of the second image capturing optical system and the third image capturing optical system is larger than the angle of field of the first image capturing optical system in each of a horizontal direction and a vertical direction.

3. The image capturing apparatus according to claim 1, wherein at an object side relative to an aperture of each of the second image capturing optical system and the third image capturing optical system, optical axes of the second image capturing optical system and the third image capturing optical system are parallel to each other.

4. The image capturing apparatus according to claim 1,
 wherein an angle between a line connecting points where respective optical axes of the second image capturing optical system and the third image capturing optical system and a plane of the second image sensor, and a longest line segment of line segments that are obtained by projecting a base line to be parallel to each side of the second image sensor is not less than 45 degrees, and
 wherein the base line is a line segment that connects centers of respective entrance pupils of the second image capturing optical system and the third image capturing optical system.

5. The image capturing apparatus according to claim 1, wherein a longest line segment of line segments that are obtained by projecting a base line to be parallel to each side of the second image sensor is more than twice as long as a focal length of each of the second image capturing optical system and the third image capturing optical system.

6. The image capturing apparatus according to claim 1, wherein each of the second image capturing optical system and the third image capturing optical system is a fixed focal image capturing optical system.

7. The image capturing apparatus according to claim 1,
 wherein the first image capturing optical system is a fixed focal image capturing optical system, and
 wherein the angle of field of each of the second image capturing optical system and the third image capturing optical system is more than twice as large as the angle of field of the first image capturing optical system.

8. The image capturing apparatus according to claim 1,
 wherein the first image capturing optical system is a magnification-varying image capturing optical system, and
 wherein the angle of field of each of the second image capturing optical system and the third image capturing optical system is more than twice as large as the angle of field of the first image capturing optical system at a telephoto end.

9. The image capturing apparatus according to claim 1,
 wherein the first image capturing optical system is a magnification-varying image capturing optical system, and
 wherein $f_m$ is the focal length of the first image capturing optical system at a telephoto end, and $F_m$ is the F number of the first image capturing optical system at the telephoto end.

10. The image capturing apparatus according to claim 1, wherein each of the second image capturing optical system and the third image capturing optical system includes at least one lens, and a lens closest to an object on an optical axis of each of the second image capturing optical system and the third image capturing optical system has a negative refractive power.

11. The image capturing apparatus according to claim 1,
 wherein each of the second image capturing optical system and the third image capturing optical system includes four lenses, and
 wherein conditional expressions below are satisfied:

$$f_1/f_2 > -1$$

$$f_4/f_3 < -1$$

where $f_1$, $f_2$, $f_3$, and $f_4$ are focal lengths of the four lenses in order from a side closer to an object on an optical axis of the second image capturing optical system.

12. The image capturing apparatus according to claim 1,
 wherein each of the second image capturing optical system and the third image capturing optical system includes four lenses, and
 wherein a conditional expression below is satisfied:

$$\frac{f_1}{f_2}\frac{f_4}{f_3} < 0.7$$

where $f_1$, $f_2$, $f_3$, and $f_4$ are focal lengths of the four lenses in order from a side closer to an object on an optical axis of the second image capturing optical system.

13. The image capturing apparatus according to claim 1, wherein the reflection member is configured to bend an optical axis of the second image capturing optical system or the third image capturing optical system including the reflection member by 90 degrees.

14. An image capturing unit detachable from an image capturing apparatus including a first image sensor that photoelectrically converts an optical image formed via a first image capturing optical system, the image capturing unit comprising:
 a second image capturing optical system and a third image capturing optical system with different viewpoints from each other; and
 a second image sensor configured to photoelectrically convert a first optical image formed via the second image capturing optical system and a second optical image formed via the third image capturing optical system,
 wherein each of the second image capturing optical system and the third image capturing optical system includes at least two reflection members configured to introduce light from an object to the second image sensor, and
 wherein a conditional expression below is satisfied:

$$0.5 > \frac{Df_s}{p_s}\frac{F_m p_m}{f_m^2} > 0.001$$

where $f_m$ is a focal length of the first image capturing optical system, $F_m$ is an F number of the first image capturing optical system, $p_m$ is a pixel pitch of the first image sensor, $f_s$ is a focal length of each of the second image capturing optical system and the third image capturing optical system, $p_s$ is a pixel pitch of the second image sensor, and D is a base line of the second image capturer.

15. The image capturing unit according to claim 14, wherein an angle of field of each of the second image capturing optical system and the third image capturing optical system is larger than an angle of field of the first image capturing optical system.

\* \* \* \* \*